United States Patent [19]

Hirmann

[11] Patent Number: 5,096,009

[45] Date of Patent: Mar. 17, 1992

[54] METHOD AND ARRANGEMENT FOR DISPLACING FORCES

[76] Inventor: Georg Hirmann, Griesernweg 14, CH-8037 Zurich, Switzerland

[21] Appl. No.: 449,470

[22] Filed: Dec. 11, 1989

Related U.S. Application Data

[63] Continuation of Ser. No. 129,965, Dec. 4, 1987, abandoned, which is a continuation of Ser. No. 800,615, Nov. 12, 1985, abandoned.

[30] Foreign Application Priority Data

Mar. 12, 1984 [CH] Switzerland ............... 1210/84-5
Jun. 12, 1984 [CH] Switzerland ............... 2819/84-8
Oct. 24, 1984 [CH] Switzerland ............... 5082/84-9
Nov. 28, 1984 [CH] Switzerland ............... 5664/84-9

[51] Int. Cl.$^5$ ............................................. B62D 57/02
[52] U.S. Cl. ................................. 180/8.1; 74/126; 92/40; 92/48; 92/90; 92/92; 180/7.1; 180/8.5; 254/89 H; 254/93 R; 254/104; 269/234
[58] Field of Search .................. 180/8.1, 8.5, 7.1, 9.1; 198/630; 279/2 A, 4, 28, 121; 269/138, 217, 234; 254/89 H, 93 R, 104; 92/40, 48, 90, 92; 74/126

[56] References Cited

U.S. PATENT DOCUMENTS

| 714,623 | 11/1902 | Sutphin | 254/93 R |
|---|---|---|---|
| 1,045,984 | 12/1912 | King | 254/104 |
| 2,424,090 | 7/1947 | Gordinier | 269/234 X |
| 2,770,433 | 11/1956 | McNally | 92/92 X |
| 3,537,540 | 11/1970 | Zuppiger et al. | 180/8.5 |
| 3,543,903 | 12/1970 | Lodige | 254/104 X |
| 3,693,740 | 9/1972 | Lewis et al. | 180/8.1 |
| 3,774,352 | 11/1973 | Weber | 254/104 X |
| 3,807,519 | 4/1974 | Patch | 180/8.5 |
| 3,831,691 | 8/1974 | Jenkins | 180/8.1 |
| 3,975,989 | 8/1976 | Hirmann | 92/91 |
| 3,985,064 | 10/1976 | Johnson | 92/48 X |
| 4,227,608 | 10/1980 | Alfthan et al. | 180/8.1 X |
| 4,382,580 | 5/1983 | Hellander | 254/104 X |
| 4,615,258 | 10/1986 | Hirmänn | 92/40 |

FOREIGN PATENT DOCUMENTS

| 531795 | 9/1954 | Belgium | 254/93 R |
|---|---|---|---|
| 569894 | 2/1933 | Fed. Rep. of Germany . | |
| 233099 | 4/1964 | Fed. Rep. of Germany . | |
| 2107296 | 10/1971 | Fed. Rep. of Germany . | |
| 2405343 | 8/1975 | Fed. Rep. of Germany . | |
| 2092367 | 12/1971 | France . | |
| 344674 | 8/1985 | Switzerland . | |
| 778664 | 7/1957 | United Kingdom . | |
| 1537366 | 12/1978 | United Kingdom . | |
| 2011350 | 7/1979 | United Kingdom | 254/104 |

Primary Examiner—Mitchell J. Hill
Attorney, Agent, or Firm—Ostrolenk, Faber, Gerb & Soffen

[57] ABSTRACT

In a method for displacing forces, particularly loads (P), either a force (P) acting on a guide surface (23) is reduced by an opposing force and simultaneously displaced, or a pressing force (P) is caused to act on a guide surface (23) in order to produce a displacing force (P2). In order to reduce the frictional resistance of the force (P) on the base (A, B) on which it acts, this force can be reduced by an opposing force and the force then displaced. The opposing force is produced, for example, by a known self-guided membrane cell (20) or a piston. Part of the force is supported displaceably on a wedge surface (23). This method permits advantageous displacement of forces, particularly loads, in opposition to friction forces.

13 Claims, 25 Drawing Sheets

[5,096,009]

METHOD AND ARRANGEMENT FOR DISPLACING FORCES

This is a continuation of application Ser. No. 07/129,965 filed on Dec. 4, 1987, abandoned, which is a continuation of application Ser. No. 06/800,615 filed Nov. 12, 1985, abandoned.

BACKGROUND OF THE INVENTION

The present method relates to a method and arrangement for displacing forces, particularly loads.

The object of the present invention is an advantageous displacement of forces, particularly loads, in opposition to frictional forces.

In none of the prior publications discussed below has this idea been even remotely disclosed or suggested.

The prior art includes an arrangement for blocking the movement of force transmission members, which permits movement of two or more force-transmission members with respect to each other. The blocking by friction or clamping of one blocking member on its guide part which is caused by one force transmission member is counteracted by the action of one or more additional force members. This arrangement serves, for instance, for eliminating backward slippage or dead motion in gears, feed spindles, step bearings, bearings and the like and therefore practically whatever play is present between moving members.

Said arrangement (Federal Republic of Germany A 569 894) is not suitable for the displacing of forces within the meaning of the present invention, as is already clear from the purpose of said previously known arrangement, namely to serve for blocking the movement of force transmission members.

Another arrangement for converting a linear movement into a rotary movement is known in which the conversion of the linear movement of a rotatably mounted drive part into rotary movement is effected by means of inclined slipways. The amount of the rotary movement is determined by the amount of the axial movement of the drive part and of the angle of inclination of the slipway, which acts in accordance with the principle of an inclined plane. This arrangement operates fundamentally in the manner of a ratchet wheel, the action of an outer force resulting in a direction of movement perpendicular to it. This arrangement also serves, via a wedge surface, to employ, for example, a horizontal force in order to lift and lower a vertical force or weight. This prior publication (OA-A No. 233 099) can also not solve the present problem.

A hydraulically operated linear motor which is provided with a clamping arrangement for the linear movement of a band, strip or the like and has two transport clamps working in opposite directions and having recesses for the belt operates in the same manner as the devices described above. This linear motor is also not adapted, or intended, to solve the purpose of the present invention. The same is true, also, of the prior publication in accordance with FR-A No. 2 092 367.

BRIEF SUMMARY OF THE INVENTION

The method of the invention is characterized by the fact that either a force acting on a guide surface is reduced and simultaneously displaced by an opposing force or a pressing force is caused to act on a guide surface so as to produce a displacement force.

BRIEF DESCRIPTION OF THE DRAWINGS

The invention will be explained below by way of example with reference to the drawing, in which, purely diagrammatically:

FIG. 40 shows a wedge motor with hollow piston with bistable pneumatic control;

FIG. 41 shows a wedge engine as two-stroke combustion engine;

FIG. 42 shows a symmetrically constructed two-cycle wedge engine;

FIG. 43 shows a wedge engine for precompressed gases;

FIG. 44 shows a wedge which is driven via eccentric;

FIG. 45 shows a pneumatically driven wedge for two types of operation;

FIG. 46 shows a thermohydraulically driven wedge;

FIG. 47 shows a mechanical drive of wedges acting with phase shift;

FIG. 48 shows a mechanical drive of wedges acting with phase shift;

FIG. 49 shows a mechanical drive of wedges acting with phase shift;

FIG. 49 shows a reversible mechanical wedge drive;

FIG. 50 shows a drive of a rotating part with curved wedge;

FIG. 51 shows a drive of rotating parts of small outside diameter;

FIG. 52 shows a wedge coupling with gearwheel;

FIG. 53 shows a synchronous push-pull coupling of two wedges;

FIG. 54 shows a wedge push transmission via coupling cell;

FIG. 55 shows a wedge-shaped power generating cell;

FIG. 56 shows a coupling cell for drive function;

FIG. 57 shows a mechanical wedge drive with reversal control;

FIG. 58 shows a wedge push and brake;

FIG. 59 shows the backward-travel relief from load of a wedge;

FIG. 60 shows a wedge drive with signal transmitter;

FIG. 61 shows a volume-proportional synchronous actuation of several wedges;

FIG. 62 shows the guidance of a roller bearing by lever;

FIG. 63 shows the guidance of a roller bearing by gearwheel;

FIG. 64 shows a wedge shape for form-locked coupling of the push force.

DETAILED DESCRIPTION OF EMBODIMENTS OF THE INVENTION

Figure 1:
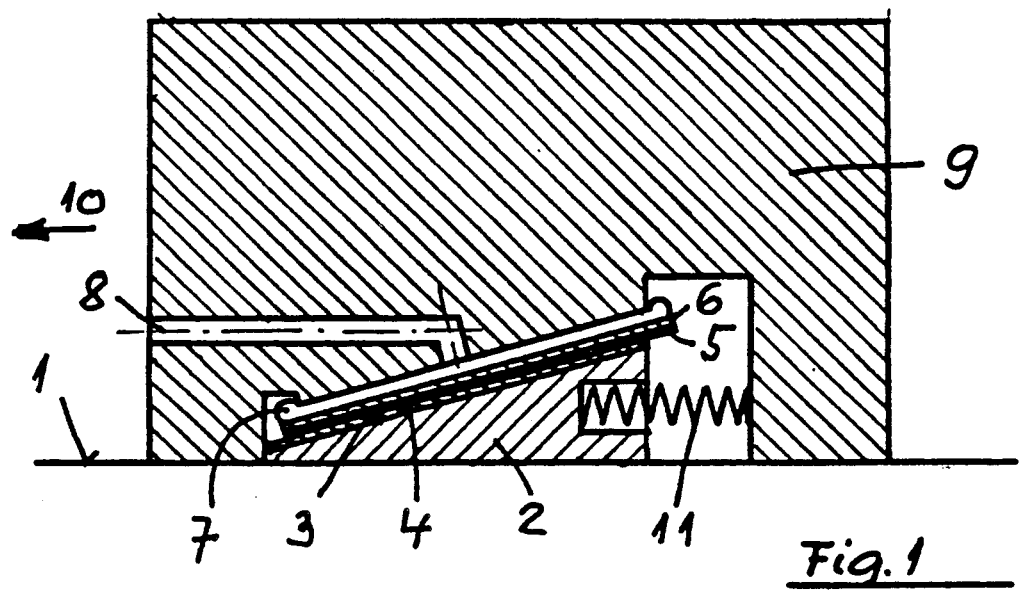
FIG. 1 shows a wedge with a lift membrane cell for lifting the load to be displaced, with the membrane cell mounted on the load inclined surface of the load.

FIG. 1 shows a push wedge 2 made of a solid material such as concrete, wood, plastic, cast steel or the like, resting on the floor 1, the wedge having an inclined smooth slide surface 3 support on top. In order to be able to produce the wedge 2 from cheaper material, the smooth slide support surface 3 may have, for instance, a polished stainless steel plate 4 thereon. The plate 4 is placed on the inclined smooth slide support surface 3 of the wedge 2 and is fastened to the wedge 2 in form-locked manner, or by cementing it to the wedge 2.

Placed upon and facing the slide support surface is a plate 5, made preferably of Teflon (TM) material or similar material, which via an intermediate layer 6 transmits the fluid pressure conducted into a membrane cell 7 via a channel 8. During the feeding of the liquid or gaseous pressure fluid the force of expansion of the membrane cell 7 against a load 9 is increased until the load starts to slide in the direction 10 on the inclined wedge plane. The further feeding of pressure fluid effects a further displacement of the load 9 as long as the relative movement between the wedge 2 and load 9 can take place as a function of the dimensions. This advance of the load can be repeated after the relief from load of the membrane cell 7 (which may also be a force generator of some other type such as a piston), and the resetting, for instance by means of a spring 11, of the wedge 2 from which the load has been removed.

Figure 2:
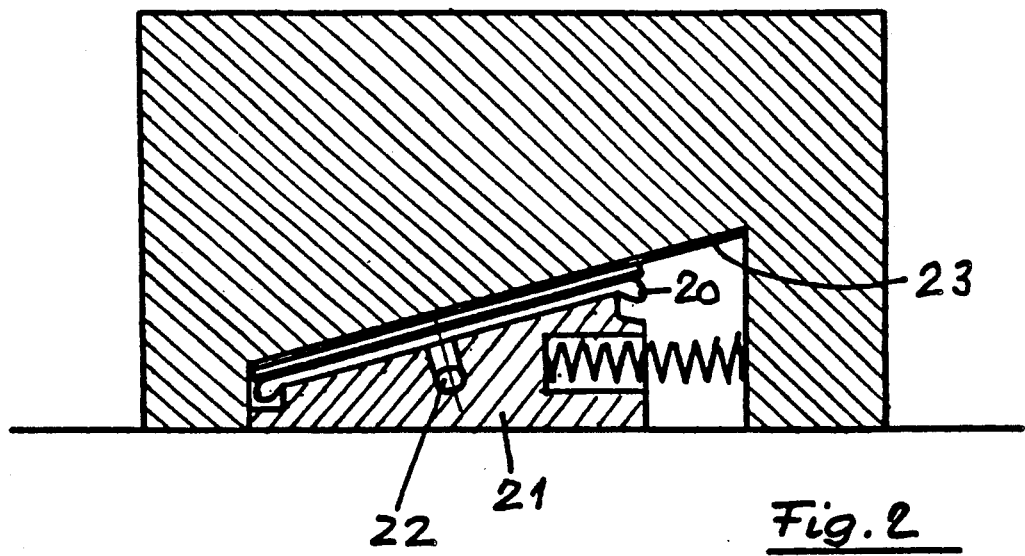
FIG. 2 shows an embodiment similar to FIG. 1 with a membrane cell mounted on the inclined surface of the wedge.

FIG. 2 shows an arrangement similar to FIG. 1 in which, however, a force cell 20 is mounted on a wedge 21 and fed via a line 22. Only a plate 23 forming a slide surface is present on the load side.

Figure 3:
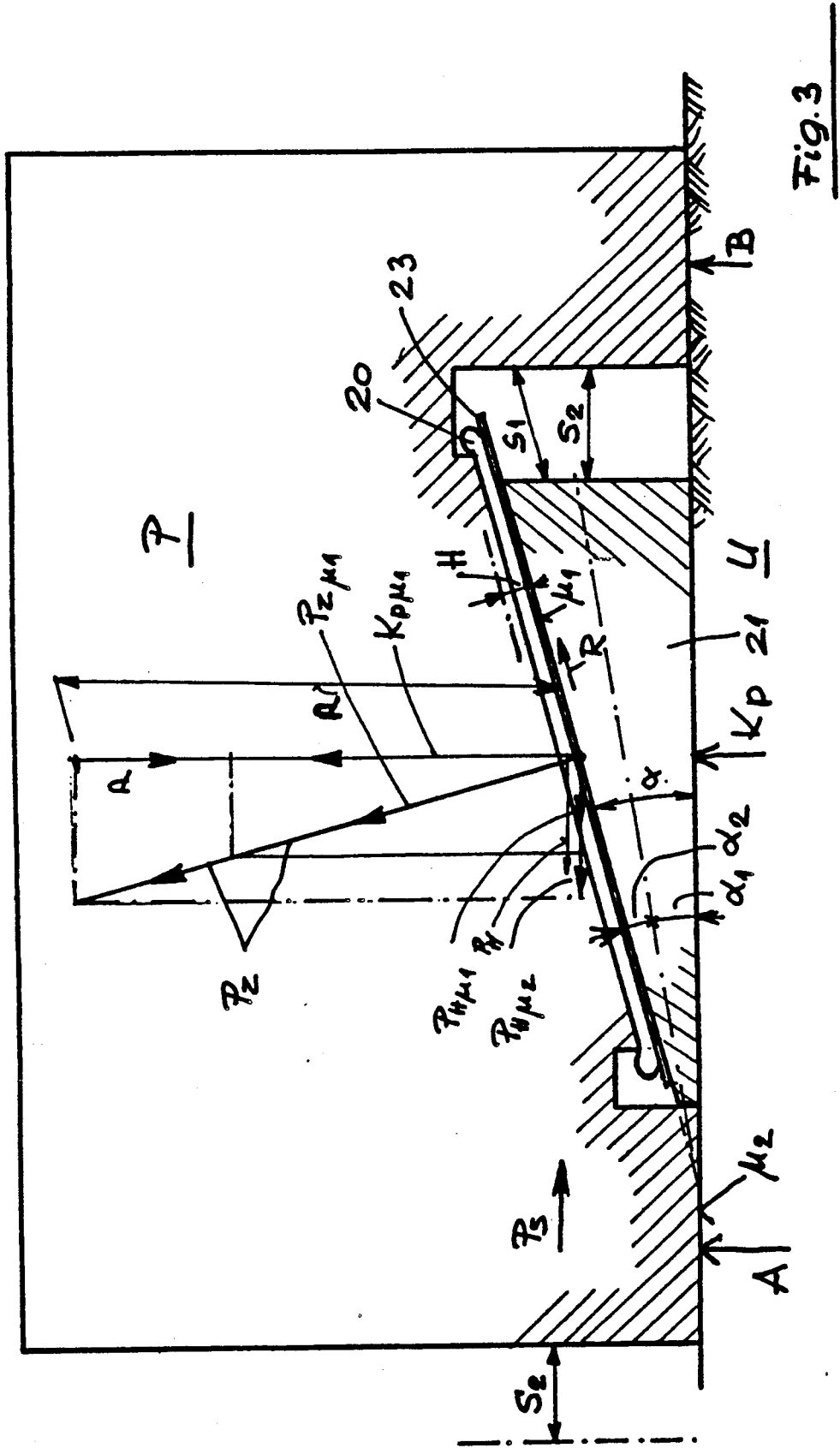
FIG. 3 shows the forces acting in an embodiment similar to FIGS. 1 and 2.

FIG. 3 shows the forces produced by loads in the case of such a wedge push process, considered purely statically.

The object is to push the load P horizontally on its base U by means of an arrangement, for instance an arrangement in accord with FIG. 2, in the position of rest shown in FIG. 3 in which the push wedge 21 with the membrane cell 20 contacts without force the plate 23 forming the slide surface, or possibly even does not contact it. If P is the total weight of the object to be displaced then the two supporting forces $A_o$ and $B_o$ result from the relationship $$P - A_o - B_o = 0 \tag{1}$$

If the center of gravity of the load P is in the center between the two support points of the forces $A_o$ and $B_o$ we then have $$A_o = B_o = P/2 \tag{2}$$

Compressed air is now fed to the membrane cell 20 until the latter rests against the plate 23 which forms the slide surface without, however, exerting force on said plate. Up to this time, equations 1) and 2) remain valid.

If further pressure fluid is now introduced into the membrane cell 20, this produces a force $P_Z$ perpendicular to the surface of the plate, which acts via the plate 23 on the body to be displaced. In conventional mechanics, this triply supported beam leads to a statically indeterminate problem (gerber beam). This force $P_Z$ has a vertically acting component of the value $$P_Z \cdot \cos\alpha = Kp \tag{3}$$

and a horizontal component $$P_H = P_Z \cdot \sin\alpha \tag{4}$$

By this process, $A_o$ and $B_o$ become smaller since we now have, with $A_o \rightarrow A$ and $B_o \rightarrow B$:

$$P - A - B - Kp = 0 \tag{5}$$

The horizontal component $P_H$ is for the time being of no consequence since, aside from the frictional forces on the support points for A and B the size of which is dependent on the weight distribution, i.e. the percentage of P on A and B (equation 5), the cell force $P_Z$ produces a frictional force or a frictional resistance, of the value $$R = P_Z \cdot \mu_1 \tag{6}$$

in which $\mu_1$ designates the coefficient of friction on the plate 23 which, by definition, corresponds to the value of $\tan\alpha_1$, $\alpha_1$ being the so-called self-locking angle.

The horizontal component of this frictional resistance is $$R_H = R \cdot \cos\alpha = P_Z \cdot \mu_1 \cdot \cos\alpha \tag{7}$$

In this case, we still have $$P_H < R_H \tag{8}$$

and therefore the load P to be displaced does not move.

If the membrane cell 20 is now acted on further, then $P_Z$ becomes larger and larger, as, in accordance with equation 3), Kp also does. In accordance with equation 5), the support forces A and B become smaller and smaller. When the cell force $P_Z$ then reaches a first critical value $P_Z\mu_1$, there is produced from this force the horizontal component $P_H\mu_1$ in line with equation 4), namely $$P_Z\mu_1 \cdot \sin\alpha = P_H\mu_1 \tag{9}$$

when the horizontal force $P_H\mu_1$ just balances out the horizontal component of the frictional resistance $R_H$ in accordance with equation 10)

$$P_H\mu_1 = P_Z\mu_1 \cdot \cos\alpha \cdot \mu_1 \tag{10}.$$

then the equilibrium position with respect to self-locking is reached. The weight P is, however, still not displaced, since the further frictional forces on the support points, namely the forces $$A\cdot\mu_2 + B\cdot\mu_2 = P_S \tag{11}$$

must still be overcome.

By further feeding of pressure fluid into the cell 20, the force, Kp will increase in accordance with equation 5) and the two support forces A, B decrease. The moment of a limit equilibrium condition thus arrives when all horizontal forces or components of forces are in equilibrium with each other. We then have the relationship:

$$P_H = P_H\mu_1 + P_H\mu_2 = P_Z\mu_1 \cdot \cos\alpha + (A+B)\mu_2 \tag{12}.$$

If now by further pumping up of the cell 20 the force Kp increases further and the forces A and B decrease, then we have the inequality $$P_H > P_Z\mu_1 \cdot \cos\alpha + (A+B)\mu_2 \tag{13}.$$

This is the moment when the load P starts to slide to the left on the wedge 21 and the horizontal support surface. This state of movement in accordance with equation 13) is maintained in the manner that, while retaining the position of the wedge 21, the membrane cell 20 is fed further so that the force $P_Z$ remains maintained in accordance with equation 13) so that the load P slides down from the wedge 21 until the geometrical dimensions terminate the process.

When this is the case, the pressure fluid can flow out of the membrane cell 20 and the wedge 21 can be brought again to the left under the displaced load P. The process begins all over again. In this way it is possible to displace the load P stepwise on a normal base by slight forces in opposition to the friction.

The work carried out during a cycle is equal, if the cell 20 carries out a working height of H during the cycle, to, $$\text{Work} = P_Z \cdot H = (A+B)\mu_2 \cdot S_2 + P_Z\mu_1 \cdot S_2/\cos\alpha \tag{14},$$

if the total horizontal path of displacement is $S_2$. In this connection, the path of displacement along the wedge is $S_1 = S_2/\cos\alpha$.

Equation 14) shows that with a given displacement $S_2$ the displacement work becomes minimal if $$(A+B)\cdot\mu_2 + \frac{P_Z \cdot X \cdot \mu_2}{\cos\alpha} \tag{15}$$

is minimum, with $\mu_1 = X \cdot \mu_2$. By transformation of this expression there is obtained the condition that $$P\cdot\mu_2 - P_Z\cdot\cos\alpha\cdot\mu_2 + (P_Z/\cos\alpha)\cdot X\cdot\mu_2 \tag{16}$$

should be minimal. This is true if for a given $\mu_2$, X and thus $\mu_1$ become small, i.e. $\mu_1 << \mu_2$. From the relationship which follows from the transformation from 16)

$$(P_Z - P_Z\cos^2\alpha)/\cos\alpha \tag{17}$$

minimum, which is true when the angle $\alpha$ is small. However, it must at all times remain larger than the self-locking angle $\alpha_1$.

The wedge angle $\alpha$ is so determined by construction that, as shown above, there is the smallest possible active wedge angle part $\alpha_2$ above the self-locking ($\mu_1 = \tan\alpha_1$). In that case the total angle is $\alpha = \alpha_1 + \alpha_2$. The force P resulting from the load can then be divided up corresponding to the two angle parts $\alpha_1$, $\alpha_2$ and thus corresponding to the frictional forces, It is assumed that a fictitious coefficient of friction $\mu_3 = f(\mu_1, \mu_2)$ exists and that, in the case of the wedge the angle $\alpha$ corresponds to the self-locking angle of P. The frictional resistance upon self-locking is in each case proportional to $\mu_3$ and $\mu_1$ respectively. The self-locking force P is therefore proportional to $\tan\alpha$ or $\mu_3$. Since the angles are small, we thus have $$\frac{K_{p\mu 1}}{P} \sim \frac{\mu_1}{\mu_3} \sim \frac{\sin\alpha_1}{\cos\alpha_1} \cdot \frac{\cos\alpha}{\sin\alpha} \sim \frac{\sin\alpha_1}{\sin\alpha} \cdot \frac{\alpha_1}{\alpha}$$

and $$K_{p\mu 1} \sim P \cdot \frac{\alpha_1}{\alpha} \tag{18}$$

as the force necessary for overcoming the self-locking $\mu_1$. The value $P - K_{gf\mu 1}$ then remains for the remaining lift force.

The maximum possible push force produced corresponding to the total angle $\alpha$ of the wedge is then $$P_{Hmax} = P \cdot \alpha \tan \tag{19}$$

From this there results the part of the force which can be used by self-locking $$P_{H\mu 1} = P_{Hmax} \cdot \frac{\alpha_1}{\alpha} \tag{20}$$

and the maximum possible active push force $$P_{H\mu 2} = P_{Hmax} - P_{H\mu 1} \tag{21}$$

From this relationship it is clear that the theoretical start of the sliding on the wedge starts with a cell force of $$P_Z < \frac{P}{\cos \alpha}$$

since for $$P_Z = \frac{P}{\cos \alpha}$$

we would have A=B=0 and $P_X=0$, which scarcely could be the case.

In the state of the theoretical start of sliding there takes place a partial displacement of the load P on the wedge 21, the part P-Kg$_{f\mu1}$ however rests on the secondary support surfaces (forces A and B). For this reason the step takes place only after the further displacement of the load P on the wedge 21 until the instantaneous value of the active push force $P_{H\mu2}$ exceeds the frictional resistance $P_S$ which at the same time becomes constantly less.

In the manner derived above, the maximum value of the active push force $P_{H\mu2}$ and the predetermination of the maximum frictional resistance $P_S$ can take place due to the size of the active angle $\alpha_2$.

The value reached upon the start of the step results from the ratio of the frictional coefficient to the wedge support $\mu_1$ and in the case of the load support $\mu_2$: if $\mu_1 = \mu_2$ then the load slides at $$P_{HS} = \frac{P_{H\mu2}}{2}$$

On the other hand, if $\mu_1$ is less than $\mu_2$ then a further lifting of the load takes place and a decrease of A and B.

The lifting of the load P takes place obviously only in the order of magnitude of the roughness of the surface, and therefore practically without lift. The length of a step $S_2$ results from the lift H of the force cell and of the wedge $\mu_1$ and its angle $\alpha$. The control of the amount of pressure fluid fed determines the speed of step and the step frequently obtainable.

When the step drive of a free-lying load P is concerned, then the angle values are always to be referred to the horizontal plane, while in the case of guided movements of advance (general force vectors) they are to be referred to the specific direction of movement.

Numerical Example: A fire door of a weight of P=30,000 kg$_f$ of concrete is to be shifted 5 m horizontally on its base, which also consists of concrete. The following values are taken as basis:

$$\mu_1 = 0{,}15; \; \mu_1 = 8{,}63°; \alpha_2 = 4{,}0°; \alpha = 12{,}63°.$$

The overcoming of the self-locking is obtained when the lift force amounts, in accordance with equation 18, to $$kP_{f\mu1} = P \cdot \frac{\alpha_1}{\alpha} = 30'000 \cdot \frac{8{,}63}{12{,}63} = 20'496 \; kg_f$$

The push force becomes, in accordance with equation 20), $$P_{H\mu1} = P \cdot \tan \alpha \cdot \frac{\alpha_1}{\alpha} = 30'000 \cdot 0{,}22 \cdot \frac{8{,}63}{12{,}63} = 4'594 \; kg_f$$

and the cell force $$P_Z < \frac{P_{H\mu1}}{\sin \alpha} = \frac{P \cdot \tan \alpha \cdot \alpha_1}{\sin \alpha \cdot \alpha} = P \cdot \frac{\alpha_1}{\alpha \cdot \cos \alpha} = 21'004 \; kg_f$$

The step-lift ratio is $$C = \frac{1}{\tan \alpha} = 4{,}56$$

numerical lift H−3 cm. The lift work in the region kg$_{f\mu1}$ corresponds, in accordance with equation 14), to $$Ar_{\mu1} = P_Z \cdot H = 63'013 \; cm.kg_f$$

The step length is $$S_2 = H \cdot C = 3 \cdot 4{,}56 = 13{,}68 \; cm.$$

With a displacement length $$S_3 = 5 \; m = 500 \; cm$$

Number of steps:

$$1 = \frac{S_3}{S_2} = 36{,}5$$

Total mechanical work in the region kp$_{f\mu1}$ $$Ar_{\mu2} = Ar_{\mu1} \cdot i = 2{,}299{,}938 \; cm \cdot kg_f = 30{,}000 \; m.kg_f$$

Upon comparison with the conventional displacement of the part of the load kp$_{f\mu1}$ and with a $\mu_2$ of 0.5 in the case of concrete on concrete, one would require at least a $P_H = 20{,}496 \times 0{.}5 - 10{,}248$ kg$_f$ from which there results necessary work of $Ar_1 = 5 \cdot 10{,}248 = 51{,}240$ mkg$_f$.

Aside from the fact that a supporting of concrete on concrete would scarcely be conceivable in the normal case, there is already present in this region of load a saving in work of at least $$\Delta Ar = 51{,}240 - 30{,}000 = 21{,}240 \; mkg_f$$

In the region A+B we have:

$$A + B = P - kp_{f\mu1} = 30{,}000 - 20{,}496 = 9504 \; kg_f$$

The maximum possible push force is $$P_{H\mu2} = P \cdot \tan \alpha = T_{H\mu1} = 6{,}600 \; kg_f$$

The maximum necessary push force is $$P_{H\mu2} = (A + B) \cdot \mu_2 = 9'504 \cdot 0{,}5 = 4'752 \; kg_f$$

The maximum necessary work in the region A+B for a length of displacement of 5 m is:

$$Ar_2 = P_H\mu_2 \cdot S_3 = 4,752 \cdot 5 = 23,760 \text{ mkgf.}$$

From the above data we obtain for the wedge push:

$$Ar_{max} = 30,000 + 23,760 = 53,760 \text{ mkgf.}$$

In contradistinction to the conventional displacement:

$$Ar = P \cdot \mu_3 \cdot S_3 = 30,000 \cdot 0.5 \cdot 5 = 75,000 \text{ mkgf.}$$

Figure 4:
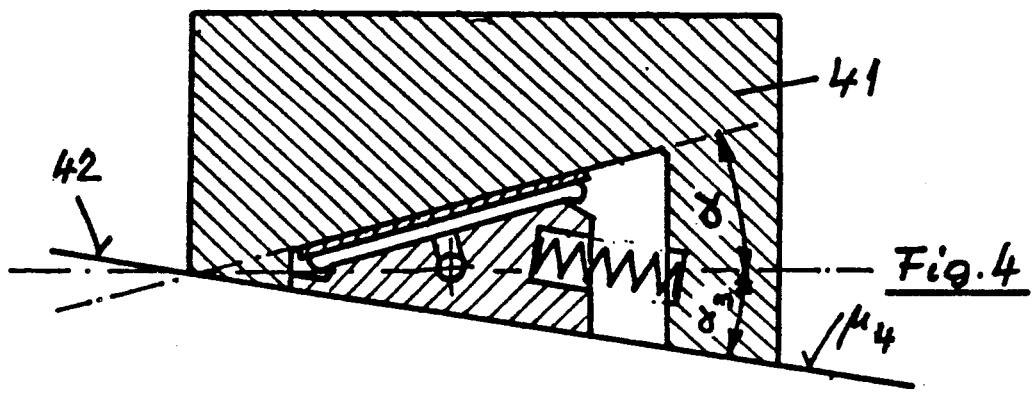
FIG. 4 shows a wedge push drive of a free-lying load on an ascending support surface.

FIG. 4 shows a wedge push device 40 of a free-lying on an inclined travel surface 42, in which the wedge angles $\alpha$ above the horizontal plane must be constructed as in connection with FIG. 3. The angle of inclination of the lower wedge $\alpha_3$ is limited by the coefficient of friction $\mu_4$. We must have $(\tan\alpha + \tan\alpha_3) < \mu_4$, in which connection, if necessary, the roughness of the surface can be increased, which is for instance, by a form-locked profiling. This gives a larger coefficient of friction $\mu_4$.

Figure 5:
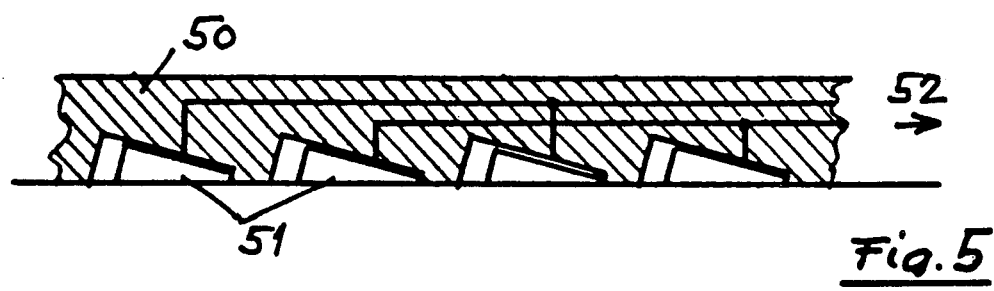
FIG. 5 shows a multiple arrangement of the wedge push elements in a beam.

FIG. 5 shows the multiple arrangement of the wedge-push in a beam 50 as alternately actuatable systems 51 for the forward direction 52, particularly for continuous forward movement.

Figure 6:
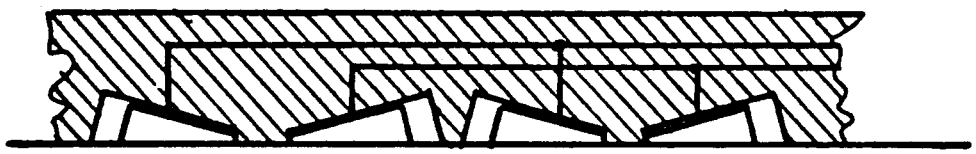
FIG. 6 shows an arrangement similar to FIG. 5 but for a reciprocating feed movement.

FIG. 6 shows an arrangement of the wedge push elements similar to FIG. 5, but alternately for both directions of advance.

Figure 7:
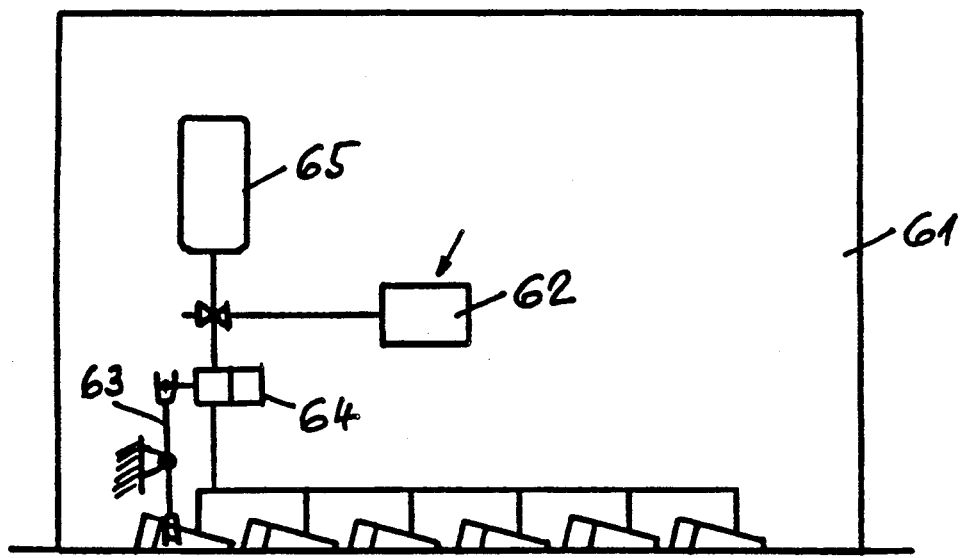
FIG. 7 shows a wedge push row in a vertical concrete slab, developed as fire door.

FIG. 7 shows, as example, a wedge push row 60 in a vertical concrete slab such as fire door or wall part which opens or closes as a function of a fire sensor 62. The control can be effected by a feeding back at 63 of the wedge movement via the valve 64 and the feeding by a pressure accumulator or a compressed gas cylinder 65 (for instance, air or $CO_2$).

Such arrangements afford new possibilities as independently operable safety systems.

Figure 8:
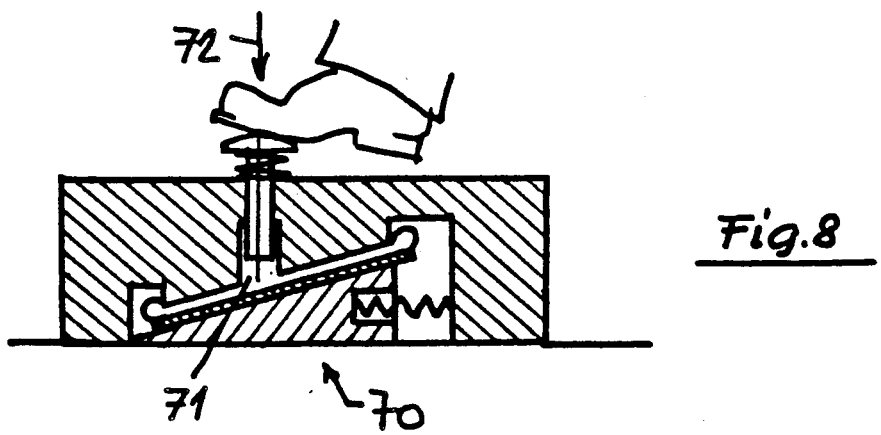
FIG. 8 shows a push wedge drive with hydraulic actuation by the user.

FIG. 8 shows an illustrative embodiment of a push wedge drive 70 with hydraulic actuation 71 in the closed system, moved by the transmission of a foot force 72. This type of embodiment makes it possible to move loads at little expense and in sensitive fashion by one or more push wedges. Closed systems can also be used as advancing means with an abutment instead of a load. Instead of actuation by foot pressure the primary pistons can be operated by hand, for instance by manual lever, or by rotating or alternating drives via a crankshaft or cams.

Figure 9:
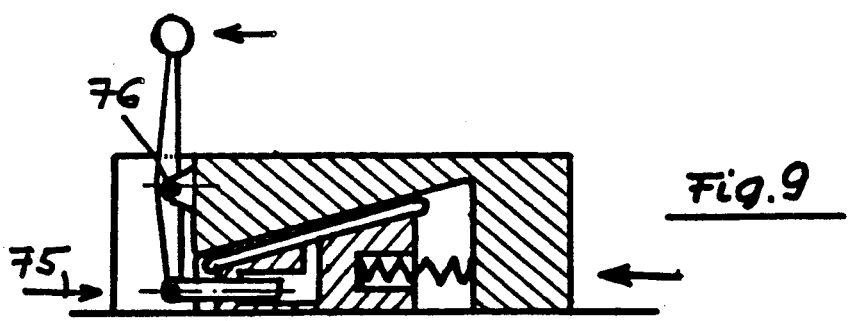
FIG. 9 shows a push wedge drive with pump lever actuatable from the outside for the lift wedge drive.

FIG. 9 shows the application of a force in the direction of push for the production of a complex lift-push function, by means of lever actuation. The reaction of the piston force 75 acts here, in addition, via the fulcrum 76, as the push force.

Figure 10:
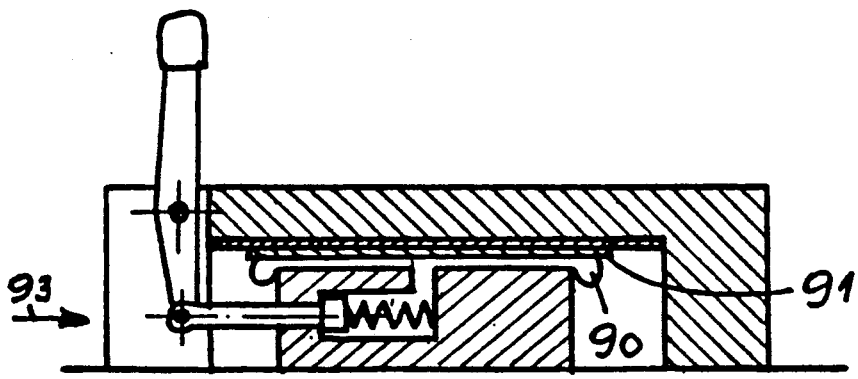
FIG. 10 shows an embodiment similar to that of FIG. 9 having a wedge angle which has degenerated to a value of FIG. 11 shows another embodiment similar to FIG. 10.

FIG. 10 shows an advancing part similar to FIG. 8 with $\alpha=0$, in which the cell 90 acts as advancing force via a slide bearing 91 in order to reduce the floor friction and the piston force 93. This drive can also be effected by hand lever, pedal or crank mechanism.

Figure 11:
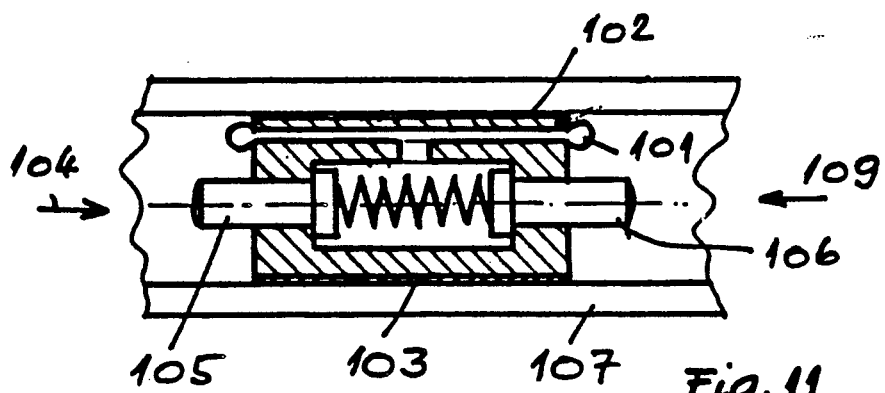

FIG. 11 shows an advancing head 100 which is an alternative embodiment of a wedge, with $\alpha=0$ (as in FIG. 10), for performing an advancing function. A membrane cell 101 in the case bears a brake lining 102, as the support surface 103 preferably also does. Two plunger pistons extend into the feed head. A pressure 104 on the piston 105 results in the clamping of the head in the guided profiled part 107 and transmits to the latter the piston force and the piston movement. Upon the relief from load of the piston 105, the advancing head detaches itself. For the advance movement in the opposite direction 109, there is employed a plunger piston 106. The advance head of this type is comparable to a wedge with $$\tan \alpha = \frac{\text{primary piston surface}}{\text{secondary piston surface}}$$

In this connection:

$$\left( \tan \alpha = \frac{F_1}{F_2} \right).$$

Figure 12:
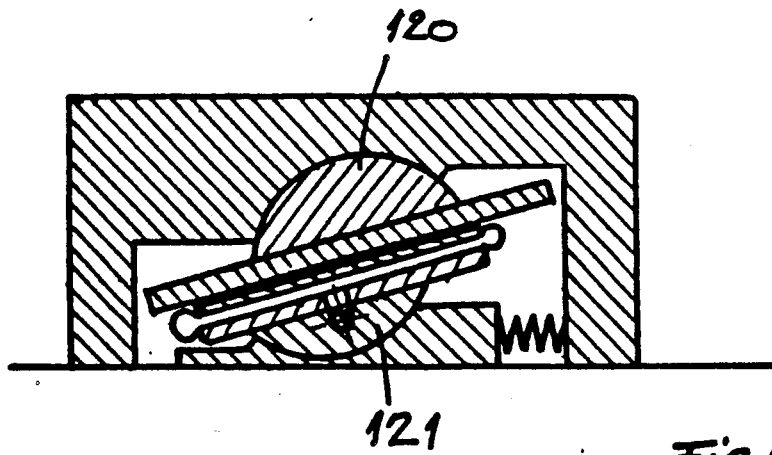
FIG. 12 shows an arrangement having a variable wedge angle of the wedge end of the load.

FIG. 12 shows a wedge-push device with adjustable wedge angle. The displacement or setting of the angle is effected via the two segment-shaped supports 120, 121, the which are fixed against the displacement forces resulting from the wedge push by means not shown.

Figure 13:
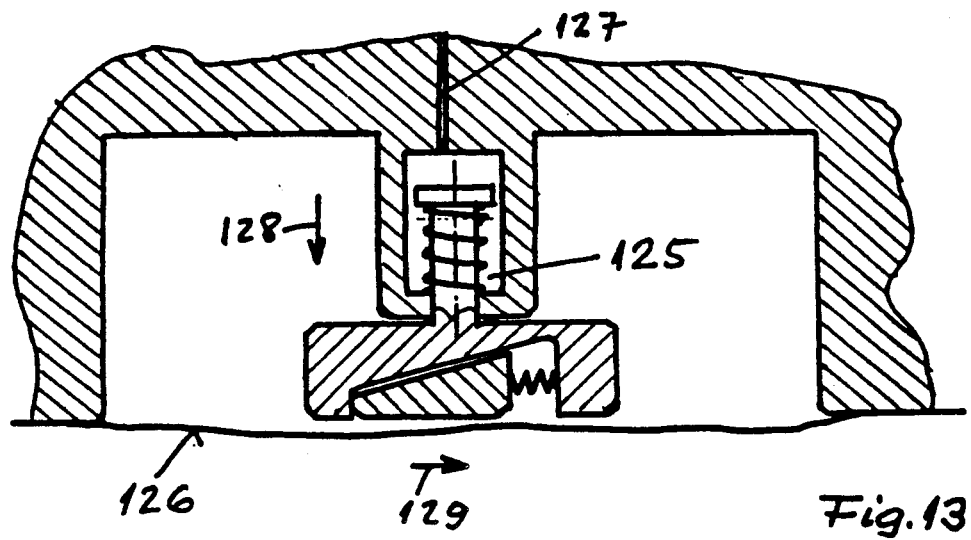
FIG. 13 shows a hydraulically vertically displaceable wedge push drive.

FIG. 13 shows a hydraulic vertically displaceable wedge push drive. Before the wedge developed in accordance with the foregoing descriptions is actuated, the vertical working cylinder 125 is hydraulically filled until the wedge push drive reaches the floor 126. The filling channel 127 is then blocked off and the wedge push process can be started. In the case of an uneven floor surface as shown, both lifting movements 128, 129 are repeated cyclically and preferably with sequence control.

Figure 14:
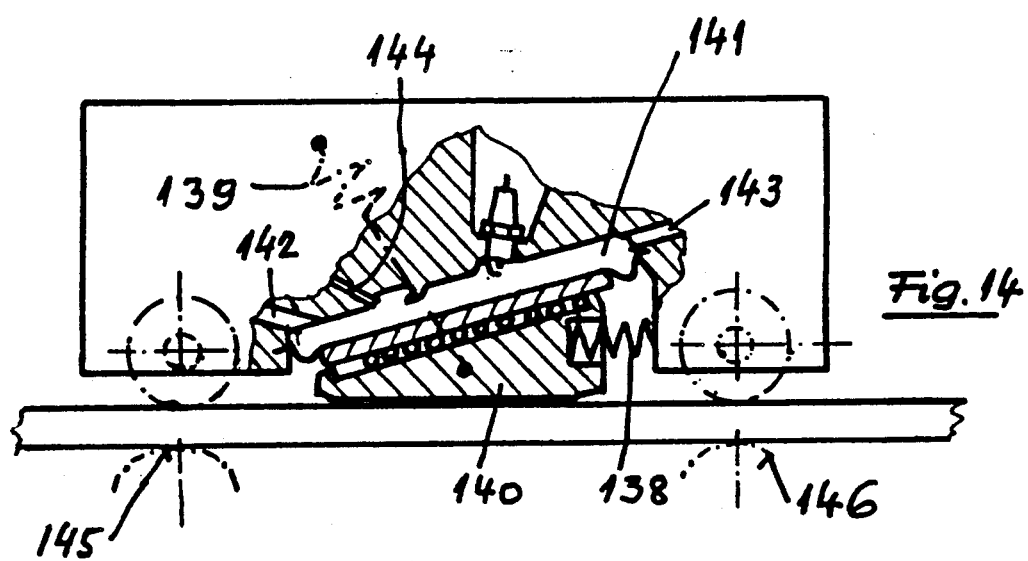
FIG. 14 shows a wedge push drive combined with a combustion cell as pressure-fluid generator.

FIG. 14 shows a wedge push drive with a combustion cell as the pressure fluid generator, seen diagrammatically. The wedge 140, which is set back and lifted for instance via springs 138 and 139, reduces the flat combustion space 141 to a size which has been determined by design. In this condition of lift, compressed air or a mixture of gas is introduced at an opening 142 and flows through the combustion cell—as long as an outlet 143 remains open. Thereupon both openings 42, 143 are closed by members (not shown) such as control or valves and the gaseous mixture is caused to explode. If only fresh air has been fed, the fuel can be injected through another nozzle 144. The control of the comb cell takes place outside the cell. The control can be controlled by external means. However, it is possible to couple the compression space of a conventional two-cycle engine or free-piston engine synchronously with the cell. In such case, the membrane or piston which has driven the wedge forms a movable part of the combustion chamber. This type of drive as impulse drive provides particular advantages in the case of rapidly moving objects. Accordingly, a rolling support can be provided for the load, as indicated. If the pressing force of the wedge is not sufficient due to the load carried, an additional support 145, 146 is provided.

Figure 15:
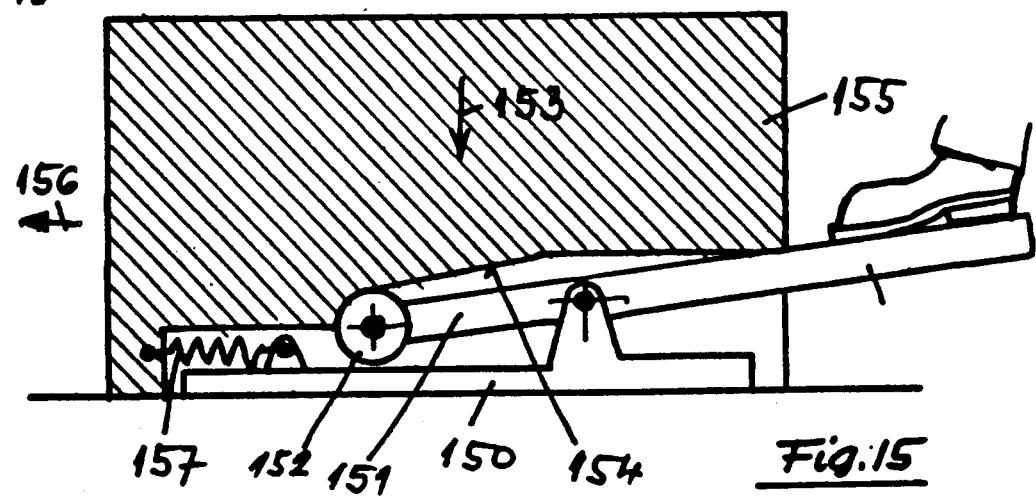
FIG. 15 shows a purely mechanical embodiment of a wedge push drive.

FIG. 15 shows a mechanical version of the wedge push drive in which a pivotally supported lever 151 on a ground plate 150 acts via a roller 152, on a surface 154 which is inclined with respect to the direction of loading of the gravity 153 and effects the displacement of the load 155 in the direction 156. The actuating of the lever 151 can be effected by foot or hand or by other means such as weight or a mechanism. The spring 157 brings the ground plate 150 back into the starting position shown in the drawing after the effecting of the push with the lever relieved of load (less friction of the ground plate).

Figure 16:
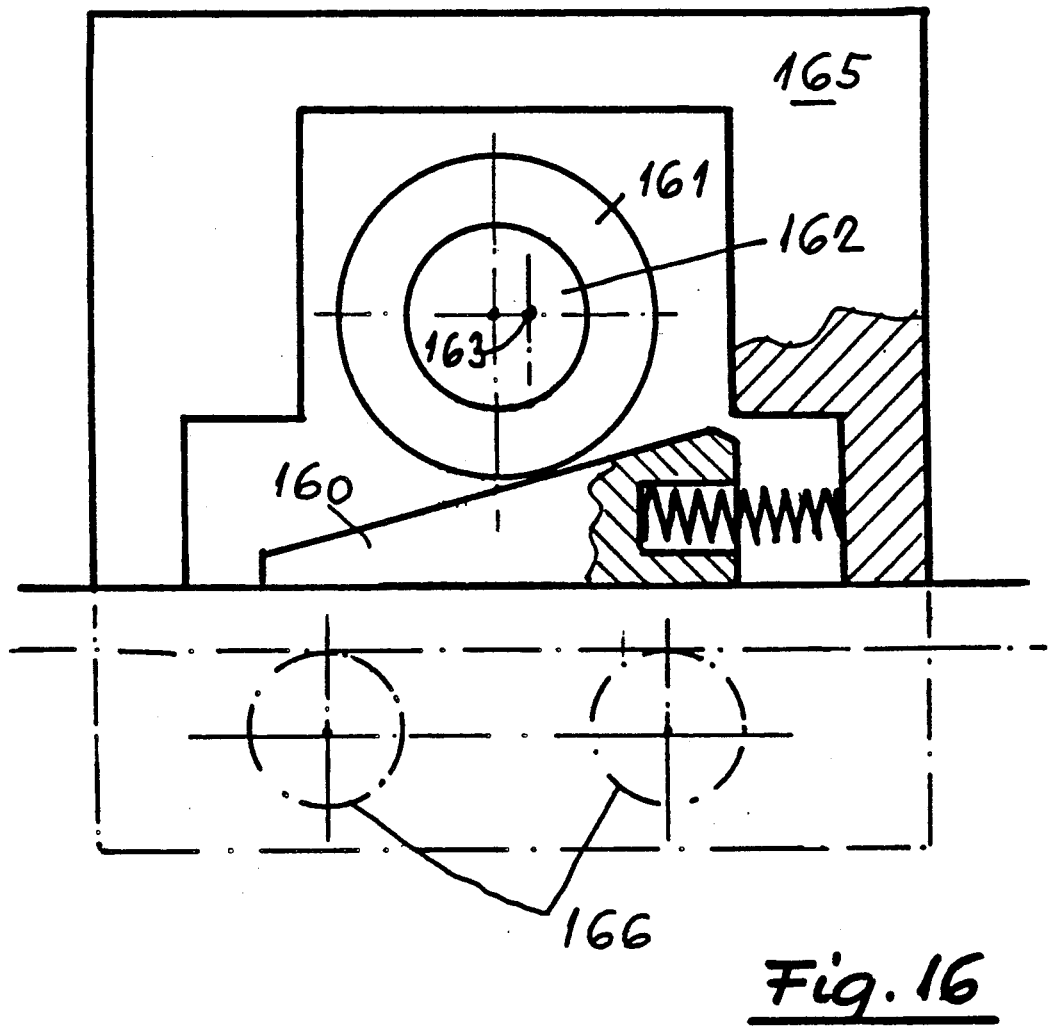
FIG. 16 shows a variant of FIG. 15 with eccentric

FIG. 16 shows a wedge push drive having a wedge 160 and a roller 161 which is mounted on an eccentric pin 162. The drive is effected around a shaft having the center point 163. This eccentric drive of the wedge can be effected, for instance, via a geared motor which is firmly connected either to a load 165 or to an abutment 166.

In such drive, the wedge assumes the sinusoidal character of movement of the eccentric drive. In order to obtain greater uniformity of the movement, a plurality of such wedge drives are provided, shifted in, phase, from each other.

The advantages of this push drive (FIG. 16) and particularly of the wedge push drive in general are many. They combine in themselves the supporting and driving of loads. They make it possible to move practically unlimitedly large loads without mechanical support problems on poor quality surfaces.

The wedges have a flat ground support on a freely determinable surface. This, in contradistinction to rollers and wheels which always result in the problems of the concentration of force on the standing surface line, makes it possible in the case of wedge push to move any desired load, such as dams, bridges, houses, fire walls, anti-terror concrete blocks, domes of observatories, etc. at extremely little expense and practically without mechanical devices on ordinary concrete travel surfaces but also, however, on floor coverings, carpets, sand, or the like. In this way the opportunity is provided, on the one hand, of constructing many things of heavy concrete where previously movement with conventional means would have led to the absurd. Also new impetus is given to architecture and new solutions provided for safety systems, including ones under water.

Loads which are movable by the wedge push drive do not "run away" when the ground slopes. They are also insensitive to "short-wave" irregularities in travel surfaces.

The push wedge drives are very compact and have a high supporting force.

One example:

With a wedge push arrangement in accordance with FIG. 5 with about 60% active cell surface in the horizontal cross section, about 2000 kg/dm$^2$ can be moved with about 30 bar medium pressure. This corresponds to a wall height of solid concrete of about 80 m. The wedge push drives can replace wheels, rollers, caterpillar tracks and the like, and do so generally at a fraction of the cost. They can produce the approximately horizontal movement, if necessary, also rotation and mounting, of large excavators, tunnel drilling machines, mining machines, container systems, cranes, movable foundation parts for large plants, underwater seals, water locks or else hangar doors, radar antennas and solar collectors.

Impulse drives such as shown in FIG. 14 provide the basic developments for new vehicle drives. Hydraulic and mechanical wedge push drives such as shown in FIGS. 8, 9, 10, 12 and 15, permit in particular the temporary movement of loads on pallets equipped therewith. They can be used both integrated and as mobile auxiliary apparatus.

In the following there will be described a few examples of the use of practical arrangements, with predominantly pneumatic feeding of energy, for the swinging drive of, for instance, files, saws, scraping and cutting apparatus, vibrating grinders, sewing machines, swinging cleaning apparatus, sieves, grids, feed and sorting vibrators as well as for impact drive, for instance for devices for nailing, stapling, riveting, stamping, marking and for impact tools of all kinds, as well as for the ramming of piles.

In this connection, the special feature resides in a wedge-shaped moved main body whose movement takes place via a short-stroke force generator, such as a membrane cell which acts on the flank of the wedge, leveraged in a manner corresponding to the wedge inclination.

Figure 17:
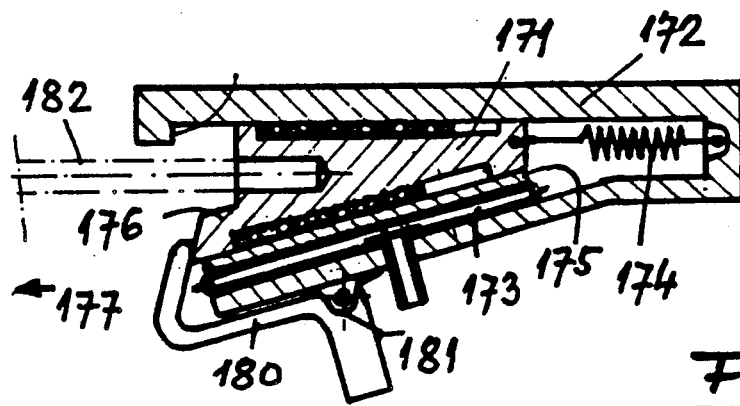
FIG. 17 shows a swinging or striking drive.

FIG. 17 shows a wedge-shaped swinging body 171 supported in the housing 172 in such a manner that upon the feeding of pressure fluid into the foil cell 173 the swinging body 171 is moved, against spring 174, via pressure plate 175 and support 176 in the direction 177 and after relief of the pressure of the foil cell 173 moved back again by spring 174. Stop 178 serves as stroke limitation.

The supplementing or converting of the swing drive to impact drive can be effected here via another stop, shown here as a lever form. This makes it possible to permit the movement of the swinging body 171 only after the pneumatic pretensioning of the foil cell 173, the cell 173 being held by the lever 180, against a spring, until the lever 180 is forced out of the way of the body 171, whereupon the potential energy which is stored in the initial volume of the foil cell is converted, against spring 174, into kinetic energy in the direction 177. The return movement is effected by the spring 174 with the foil cell relieved of pressure The tool moved is indicated by 182.

Figure 18:
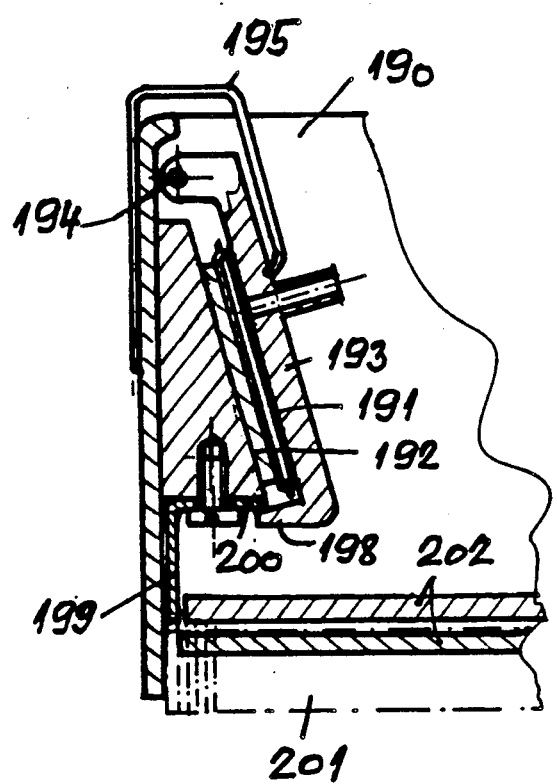
FIG. 18 shows an embodiment as stapler.

FIG. 18 shows an embodiment of the invention namely a stapler in which the short-stroke force generator 191 (for example, foil cell) is arranged in the housing part 190 and of the pressure plate 192 is arranged on the lever 193 swingable about the pin 194. The lever is pressed via spring 195 and mount 196 against the wedge shaped swing body (impact body). The pneumatic prestressing is built up against stop 198 until the increasing cell force lifts the lever 193 against spring 195 and releases the stop 198 whereupon the impact takes place. The functional parts of the stapler are the ram 199 which at the same time forms the stop edge 200. The staples 201 as well as the guide 202 for them are diagrammatically shown. The return of the impact body can be effected by spring, as in the case of FIG. 17, or by a forward stroke during the release process. The slide support shown in FIG. 18 can be developed by metal/metal or teflon/metal combinations. In the embodiment of FIG. 18, the swing body could also consist of sinter metal impregnated with lubricant, with mating surfaces of steel.

Figure 19:
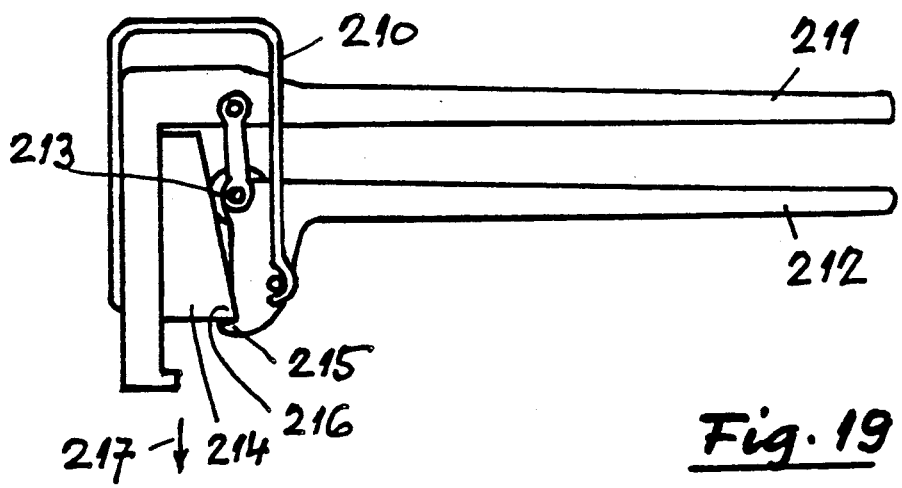
FIG. 19 shows a manually operated drive.

FIG. 19 shows a hand-operated impact device. The clamping against spring 210 is effected by pushing together of the levers 211 and 212 as in ordinary pliers. During the clamping process, roller 213 is pressed onto the wedge flank of the swing body 214 and the hook-shaped stop 215 opens. After jumping over the stop edge 216, the mechanical energy stored in the spring during the clamping accelerates the swing body in the direction 217. The guide of the clamping lever 212 secures pivot arm 218.

The particular advantages of the device shown are their economical manufacture and light weight. The latter permits substantially easier handling in the case of hand tools.

Instead of the foil cells shown, membrane cylinders can also be used, as well as merely mechanical actuation.

FIGS. 20 to 39 show material conveyor with the so-called H-STEP (trademark) system. Depending on the of use, two types of functions can be employed:

Slide-step modules for stepwise or continuous movement of loads, as well as impulse drives for moving loads by short impulses on roller tables and the like.

H-STEP installation modules for slide-step conveyor paths make it possible to move workpieces, shells or pallets resting thereon stepwise or continuously in one, two or three dimensions, continuously or with star/stop control, with variable feed speed and, if necessary, reversibly.

Figure 20:
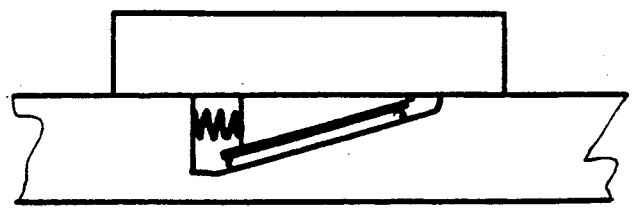
FIGS. 20 to 39 show further examples of embodiments of the invention.

Slide-step conveyor paths consist of individual conveyor modules or of conveyor beams, as well as their combinations (FIG. 20).

The H-STEP slide step conveyor module embedded in the load support plane, incorporated in such a manner that the pneumatically or hydraulically moved wedge first of all takes up a part of the load and then displaces it by the length of the wedge stroke. Upon the removal of load from the wedge, the load moved is deposited fully on the vertical support plane and the wedge is brought back the starting position by a spring (FIG. 21).

Figure 21:
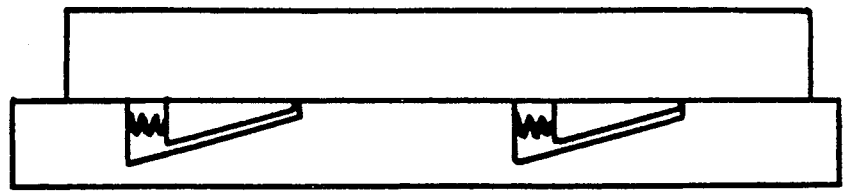
Figure 22:
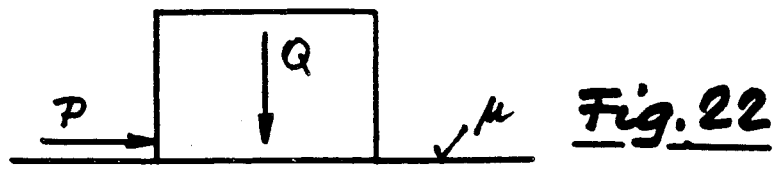
Figure 23:
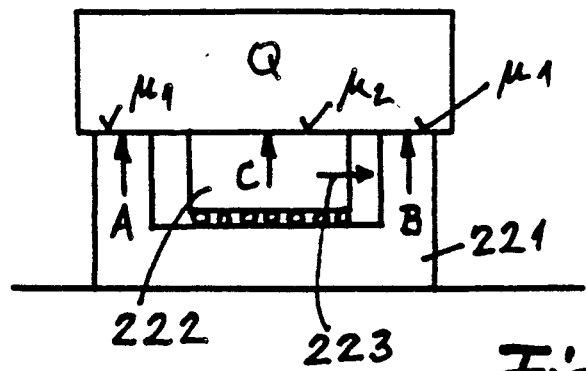
Figure 24:
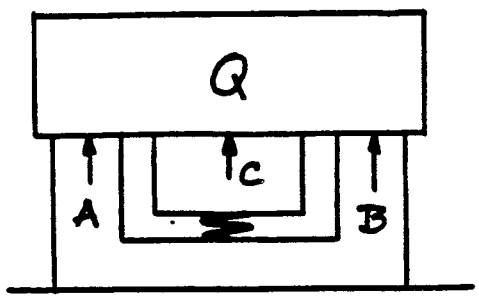

Slide-step conveyor beams normally contain at least two simultaneously controlled drive modules (FIG. 21). They form conveyor paths which can be expanded and combined as desired and, if necessary, converted. They can also be used for the programmed selecting and feeding of the material to be conveyed. The conveyor paths can contain integrated weighing and machining stations or locks.

Further advantages are:

Easy cleaning, sterilizable and explosion-safe. Permits conveyance even in wet, dusty, heated regions, and in corresponding embodiments even under liquid.

The Physics of Slide-Step Conveyance

If a load is placed on a horizontal surface, the force necessary for displacement will be $$P = Q \cdot \mu \quad \text{(FIG. 22)}.$$

If the load Q is placed on two surfaces (221,222) with equally great force then, for the same coefficient of friction (FIG. 23), i.e.

$$Q = A + B + C$$

$$Q/2 = A + B = C,$$

the same frictional resistance is produced on both support bodies 221 and 222 and upon movement of the support body 222 in the direction 223 it remains undetermined whether and to what extent the load will be carried along. Here, therefore, there is a neutral equilibrium.

In order to assure the carrying along of the load with the support body 222 (FIG. 24), there are fundamentally two possibilities, namely:

a) to change the coefficients of friction in the sense $\mu_1 < \mu_2$ b) to change the ratio of the support surface in the sense C > A + B by an additional lift force, pneumatically, hydraulically or by spring element, c) the combining of a and b.

Figure 25:
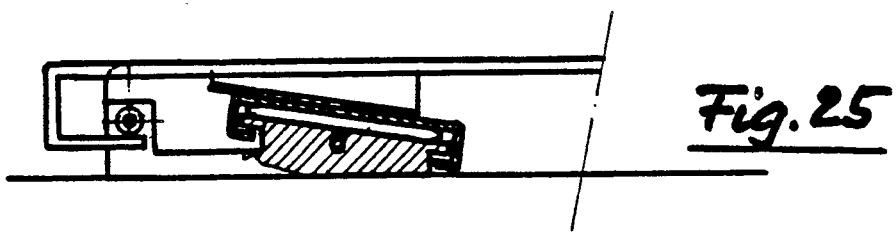
Figure 26:
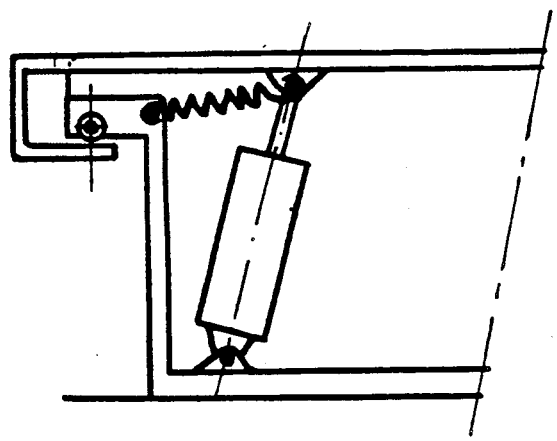
Figure 27:
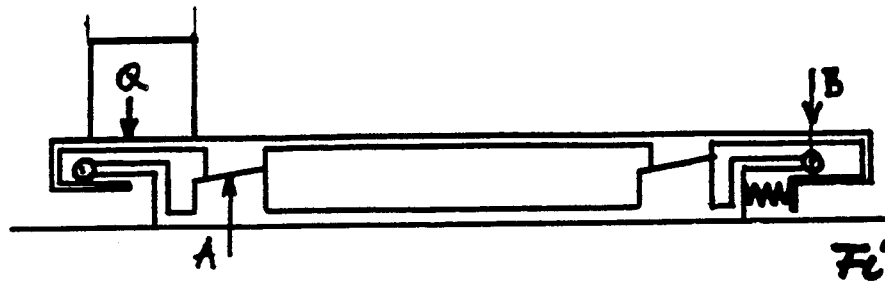
Figure 28:
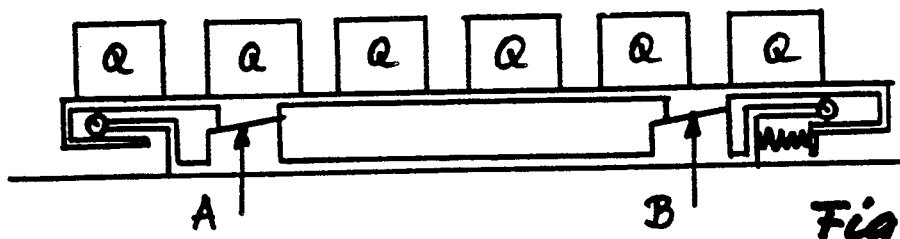
Figure 29:
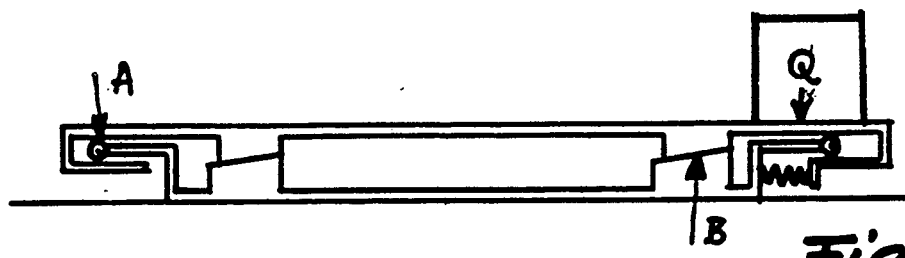

The manner of construction of the slide-step conveyorpath path modules is based on the active wedge, or an alternative design, with a cylinder with a pretensioning device set up at an angle to the direction of advance. These two variants are shown in FIGS. 25 and 26.

The Dimensioning of the Slide-Step Conveyor Modules

The conveyor modules are loaded differently depending on beam arrangement, loading state and instantaneous position of the load. Therefore, in principle, it is necessary to verify three extreme loading cases, shown in FIGS. 27 to 29. The installed slide-step modules must, in each case, properly satisfy the carrying out of the two-dimensional lift process.

The continued stepwise conveyance of one or more loading bodies with the system described above can be effected in the form of individual elements or as a conveyor path insofar as they can be so designed that the following conditions are satisfied in the cyclic repetition (FIG. 23):

Upon the advance step: $C \cdot \mu_2 > (A + B) \cdot \mu_1$ and upon the return stroke of the support body 222:

$$C \cdot \mu_2 < (A + B) \cdot \mu_1$$

Figure 30:
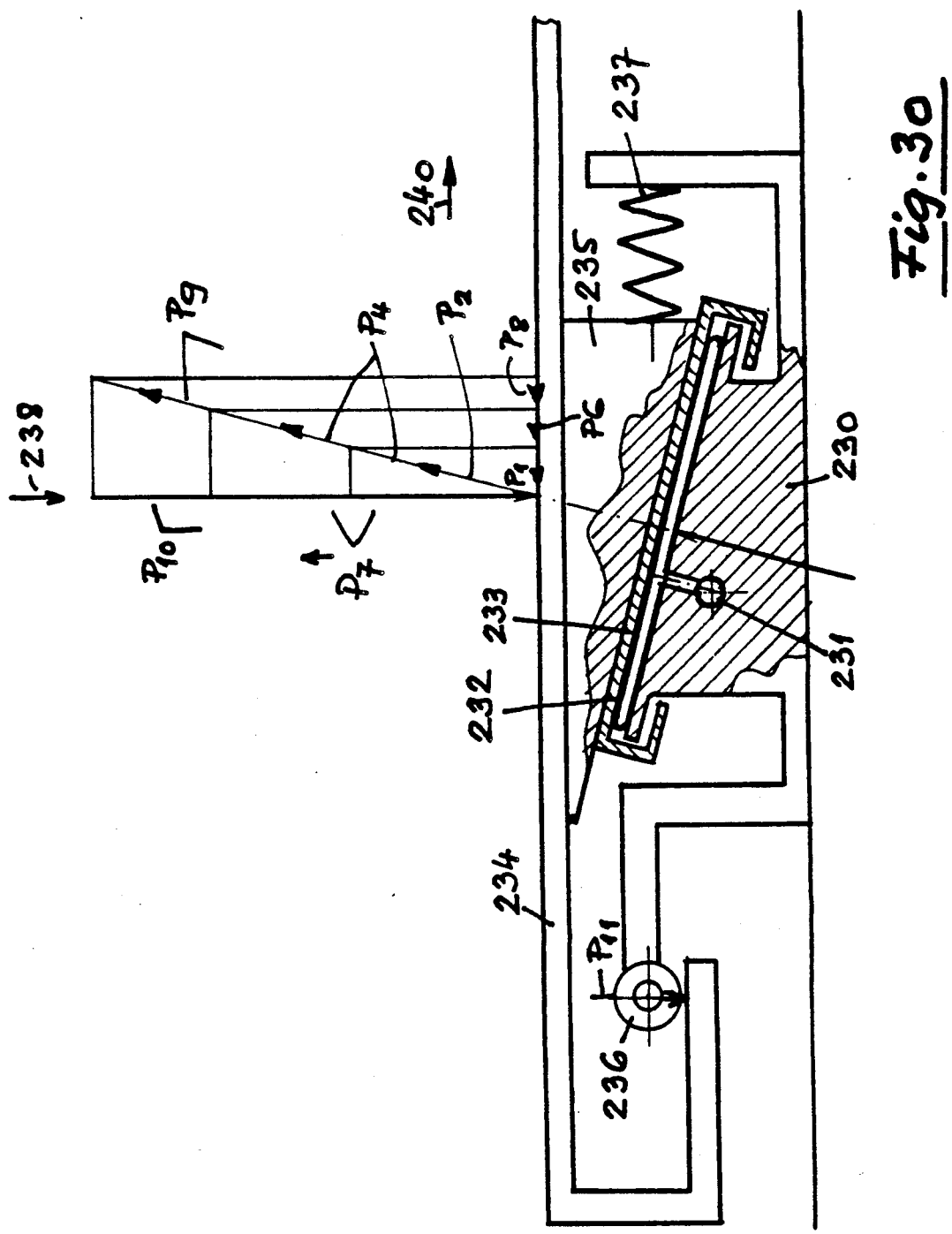

The forces acting in the case of the slide-step module are shown in FIG. 30. A slide-step module of a conveyor beam is symbolically shown as an illustration of an embodiment with the active wedge 230 whose stroke takes place, for instance, by the force cell 232 which is controlled and fed via channel 231 and acts via pressure plate 233 (on) the slide support surface of the opposing wedge 235 connected to the beam 234. As the force generator, membrane cylinders or the like can also be used. The guide rollers 236 are so attached that the beam 234 (see FIG. 23, 222) can be lifted slightly, upon the forward stroke above than the fixed support body on both sides (see FIG. 23, 221). The spring 237 serves for the tensioning force as well as for the return function after the completion of the forward step.

The advancing process proceeds as follows.

By the pressure fluid fed via channel 231 the force cell 232 exerts increasing pressure via the slide mounting on the mating wedge 235.

If a load 238 is present on the conveyor path, then the beam carries out only a vertical stroke until the receiving of the load and the following condition arises:

$$C \cdot \mu_2 > (A + B) \cdot \mu_1 \quad \text{(see FIG. 30)}$$

Before an advance takes place, $P_Z$ must reach the value corresponding to the spring tension $P_1$, namely $P_2$. $P_Z$ is the force of the cell, i.e., the force vector perpendicular to cell 232. In FIG. 30, $P_Z$ is the sum of $P_2$, $P_4$ and $P_9$.

Similarly, before the forward movement the horizontal component P of the frictional resistance on the wedge support must be taken overcome; therefore, $P_2$ must increase to the value of $P_4$, as the result of which the load assumption force increases to $P_7$. In this phase the loading phase corresponds to:

$$C = \frac{Q - P_7}{2} + P_7 \text{ and } A + B = \frac{Q - P_7}{2}$$

During this phase, prior to the advance there also takes place a further increase of $P_Z$ in order to overcome the frictional resistance $P_8 = (A+B) \cdot \mu_1$. For this, a further increase of $P_2$ to $P_9$ is necessary, in which connection, during the taking over of the load on C, the partial load $(A+B)$ is further reduced and the conveyor beam now shifts, together with the load, in the direction 240.

The guide rollers 236 enter into operation when $Q < P_{10}$. The roller 236 in this case supports the raised beam 234 with a force $P_{11}$ which in the line of action of Q would have the value $P_{11} = P_{10} - Q$.

Upon the rearward movement of the conveyor beam, the force cell is relieved, the load is deposited on the fixed support bodies, and the conveyor beam is pushed back to the starting position by spring 237.

The following FIGS. 31 to 39 show two other embodiments.

Figure 31:
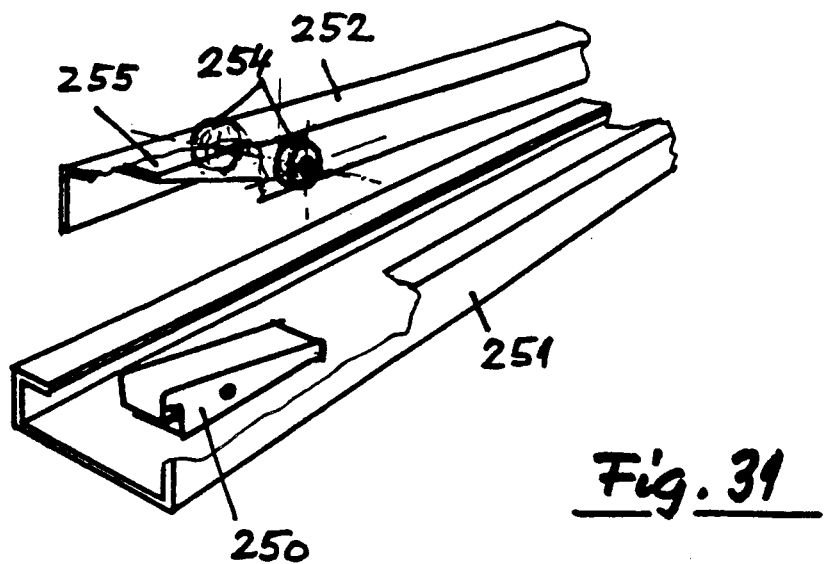

FIG. 31 shows an embodiment of a suitable type of construction for the development of a slide-step module technique in which the active wedges 250 are fastened in a U-shaped profiled member 251. The conveyor beam 252 bears the mating wedge 255 which is fastened here by the shafts 253 of the rollers 254. The stop surface of the rollers is the inner side of the profiled member 251. The return spring has not been shown.

Figure 32:
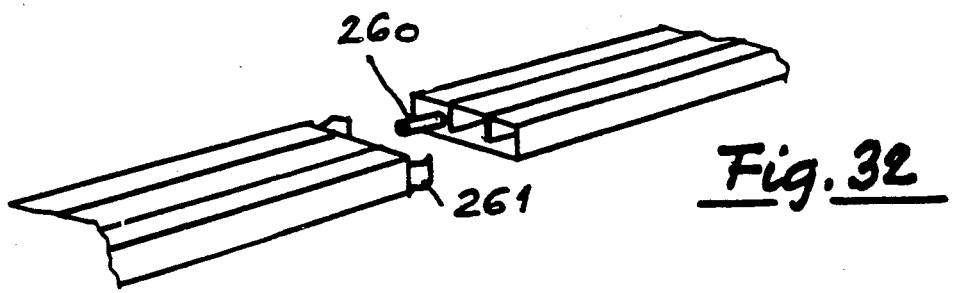

FIG. 32 shows diagrammatically the possibility of lengthening the beam modules by plug connection 260 and centering pins 261.

Figure 33:
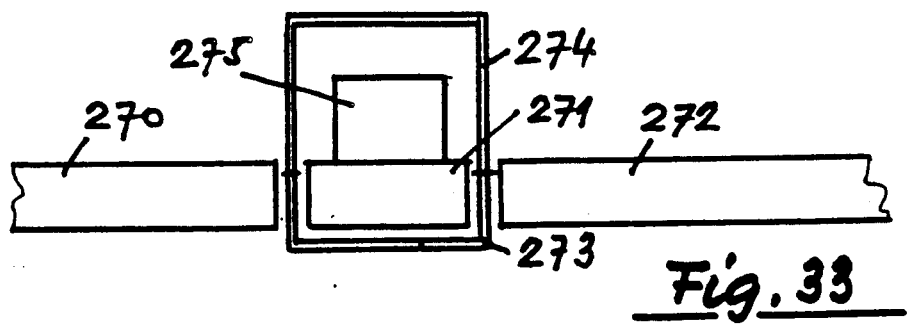

FIG. 33 shows the possible separation of the conveyor line 270, 271, 272 in order to carry out an operation on the material being conveyed. The figure shows termination parts 273, 274.

Figure 34:
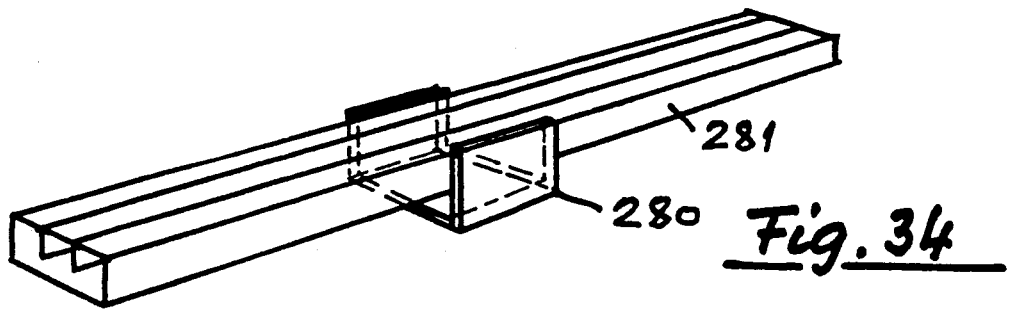

FIG. 34 shows a U-shaped part 280 in order to lift the material conveyed from the conveyor path 280 for an operation, for instance for weighing.

Figure 35:
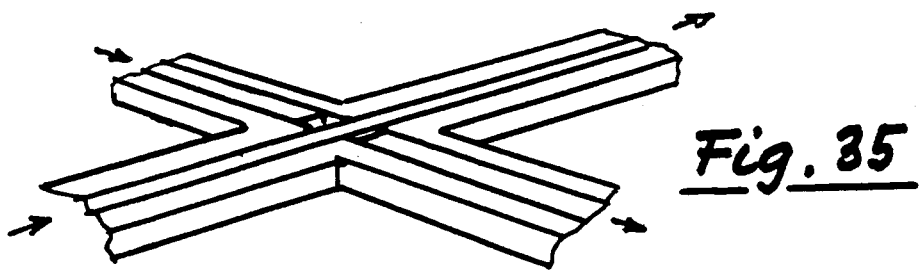

FIG. 35 shows an intersection of the conveyor paths in order to separate given parts laterally.

Figure 36:
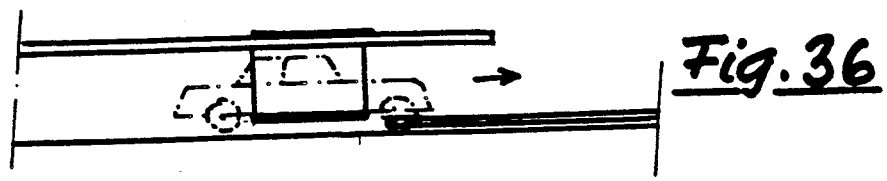

FIG. 36 shows the taking over of a hanging load from an overhead slide conveyor path onto a slide conveyor path located below it.

Figure 37:
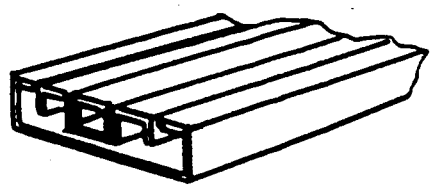

FIG. 37 shows a push-pull slide conveyor path for continuous movement of material.

Figure 38:
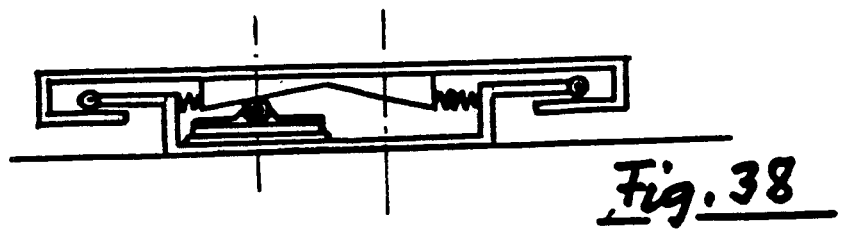
Figure 39:
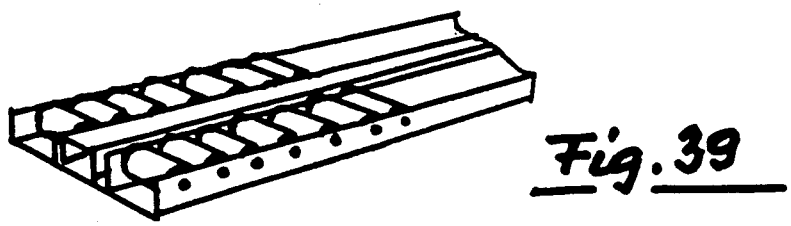

FIG. 38 shows diagrammatically a slide-step module in which the relative offset of the double wedge 300 to the force generator 301 makes it possible to select the direction of advance FIG. 39 shows an impulse conveyor path with rollers (or ball casters) for rapid conveyance of piece goods.

The control of the step sequence in H-STEP slide-step conveyor paths and conveyor modules can take place in various manners, by:

a) feeding back of the forward movement to a bistable or bistably controlled valve, b) a stable multivibrator with fixed or variable frequency, preferably with start/stop control, c) microprocessor or computer.

The large number of types of construction, module combinations and control possibilities with the possibility of logical coupling of control processes and outside operations permit entirely novel concepts, particularly in connection with the construction of complex manufacturing lines the movement of the material of which can be controlled centrally between standstill and maximum forward speed and can be stopped upon the occurrence of disturbances.

The stationary support members (FIG. 23 A,B, FIG. 31, 251) can serve, as support surface of high precision, as parts of a device for measurement, shaping, assembling or the like from which the integrated conveyor beam further conducts the parts after completion of the operation.

The forwardly pushed parts can also be held fast by stop or holder-down or vacuum and then released.

The examples in accordance with FIGS. 40 to 64 concern drives having an active wedge as oscillating converter element of a new digital mechanism for portioning the mechanical work and use as impulse drive for masses to be moved.

Figure 40:
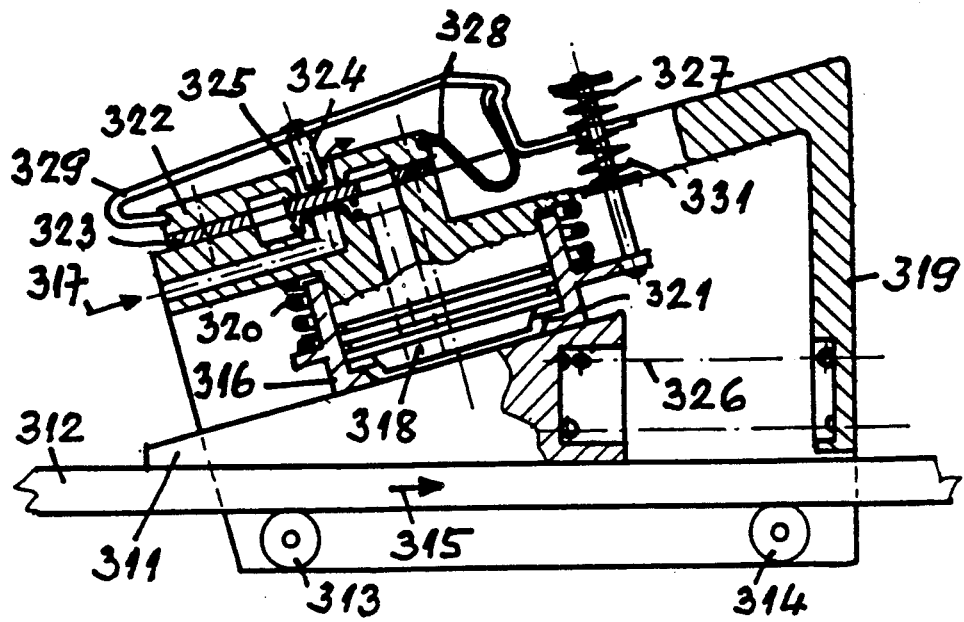
FIGS. 40 to 64 show embodiments of drive devices for the conversion and/or transformation of forms of energy, namely

FIG. 40 shows a motor with wedge 311, acting on push members 312, supported by rollers 313, 314. The push force in the direction 315 is produced, for example, by means of hollow piston 316 and by the action of the pressure fluid which is oscillatingly fed via channel 317. The guide piston 318 is in this case firmly connected to the housing 319. The spring 320 serves for slightly pressing against the hollow piston, the sealing action of which is supported by the inner edge 321 acted on by medium pressure. The figure also shows an example of a mechanical feedback. This can take place, in principle, from the lifting movement of the force generator—in this case the working cylinder—, from the movement of the wedge, from other synchronously moved parts or from a motor unit of similar type coupled, for instance, in push pull.

The present example shows a membrane valve which is bistably controlled by the piston 316. The membrane 323, which is clamped simultaneously as seal between housing 319 and cover 322, closes off the pressure-fluid inlet 317 by the pressing action of the pin 324 or leaves the membrane free to seal off the outlet opening 325 by the action of the pressure fluid introduced. The figure shows this introduction phase upon the start of the forward push phase whenever the wedge 311, supported on push body 312, is pushed forward against spring 326.

The feeding back of the piston movement is effected via spring 327 and by the tilting of the lever 329 under the action of spring 328, as a result of which the pin 324 suddenly closes the inlet opening 330 and opens the outlet 325. The feedback for the next for advance phase takes place via spring 331.

Feedbacks of this kind, in combination with wedges actuated with pistons or force cells, make it possible to keep the moving mass very low, as a result of which a relatively high stroke frequency can be obtained, such as affords advantages, in particular, in the case of oscillating tool movements.

Figure 41:
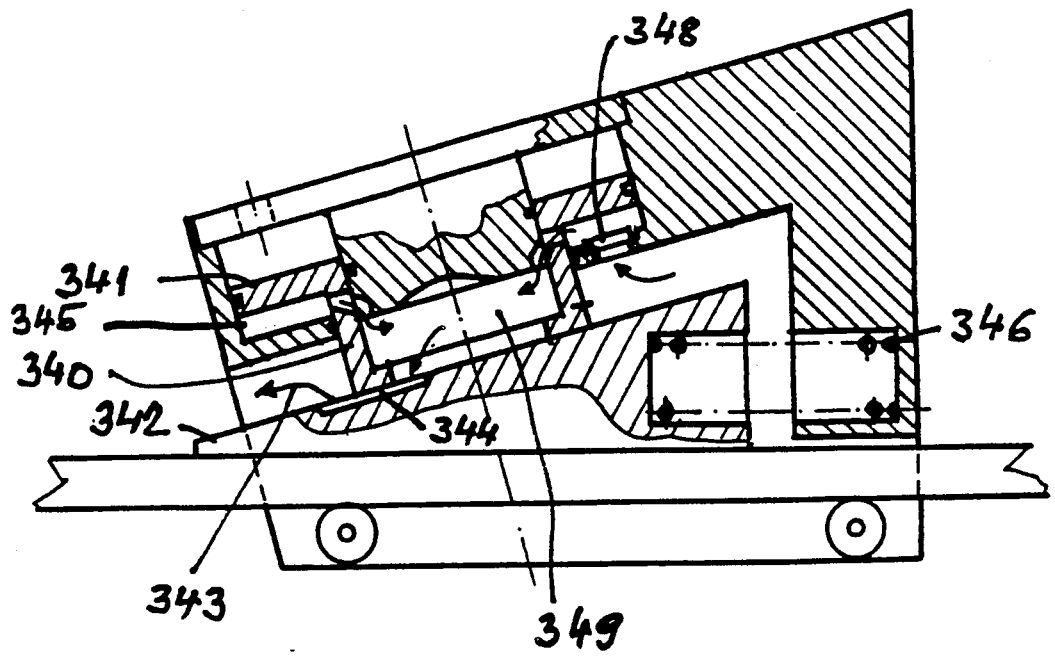

FIG. 41 diagrammatically shows a two-stroke wedge motor, as example of an embodiment with hollow piston 340 as differential piston, with an annular charging piston 341 and the wedge 342, simultaneously as control slide for the exhaust control 343.

A mixture preparation or fuel injection device and the ignition device have not been shown.

The figure shows the completed advance phase with open exhaust pipe and the flushing process, via the slide-valve opening 344, out of the compression chamber 345. The return of the wedge by spring 346 effects the compression in the combustion chamber 349 and the drawing-in of the fresh air (or mixture) through the opening 348 shown here as valve.

Figure 59:
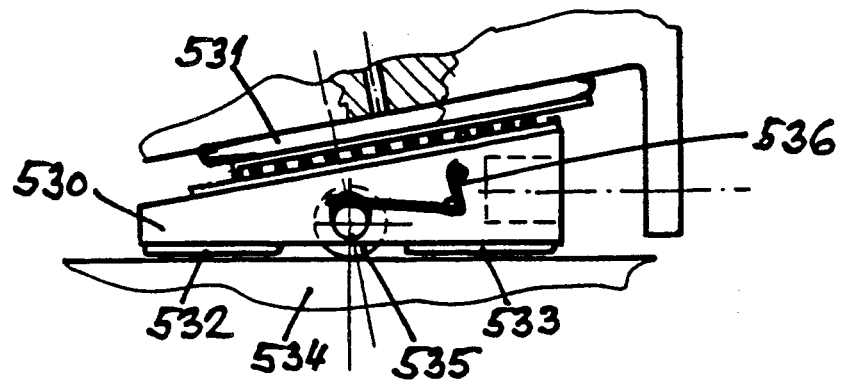

In order to reduce the frictional losses during the compression process on the push body, the wedge can be relieved from load by spring action during this phase (see also FIG. 59).

Figure 42:
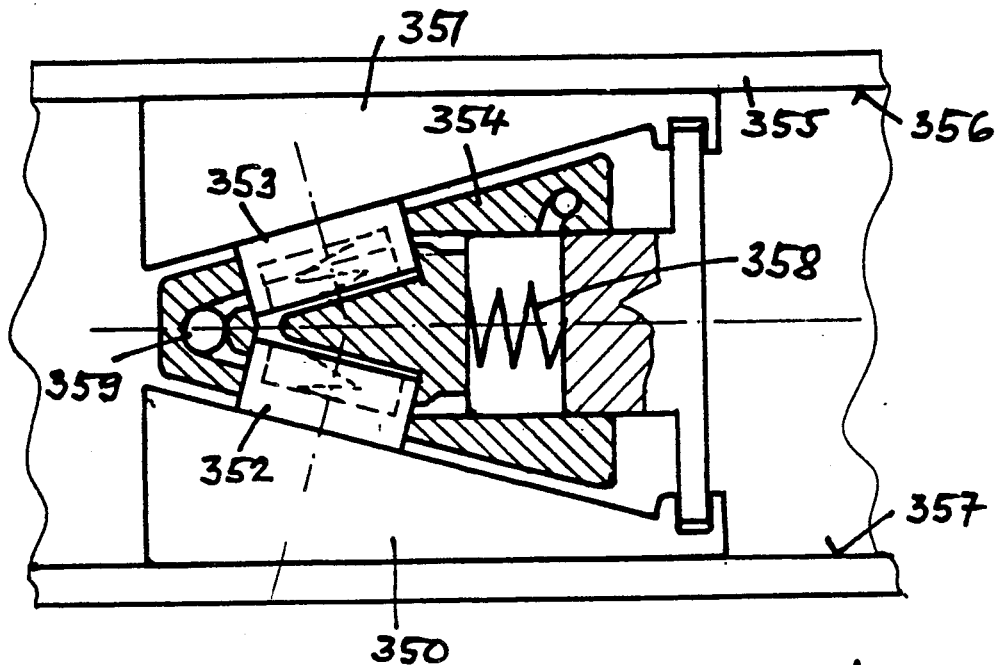

FIG. 42 shows diagrammatically a combustion engine with two simultaneously acting symmetrically arranged wedges 350, 351 acted on via pistons 352, 353. The relative advancing movement takes place between housing part 354 and guide part 355 with the opposite pressing surfaces 356, 357. The other guide parts have not been shown. The suction process is effected by spring 358, for instance via a valve flap (not shown), and the exhaust takes place via channel 359.

The figure shows the start of the combustion phase.

Figure 43:
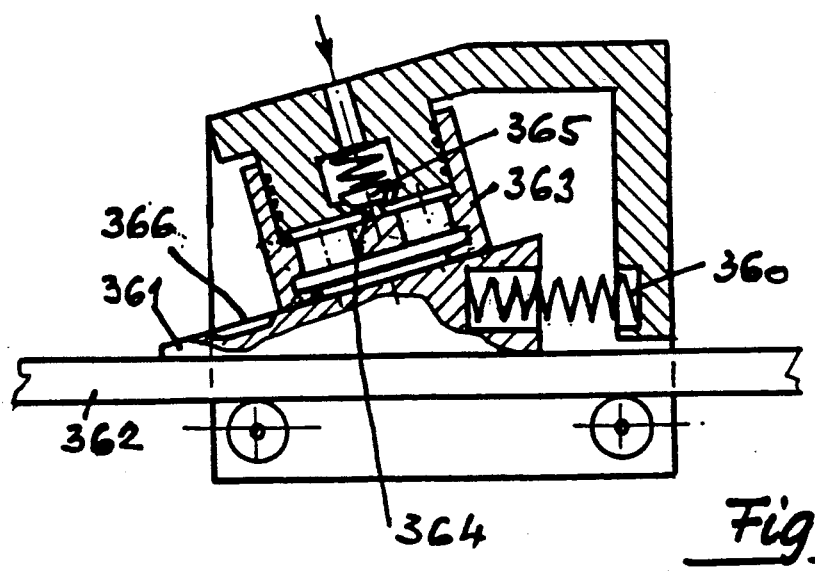

FIG. 43 shows a motor for compressed-gas (or compressed-air) feed. The wedge 361, which is tensioned by a spring 360 and rests against the push member 362, presses the hollow piston 363 with a stop part 364 located thereon against the inlet valve 365, whereupon the pressure fluid flows into the cylinder chamber.

The forward movement takes place during the expansion phase of the pressure fluid, which, during the end phase of the stroke, flows via the exhaust opening 366 into the open. Here, therefore, the wedge acts also as control slide valve, as it did already in FIG. 41.

Figure 44:
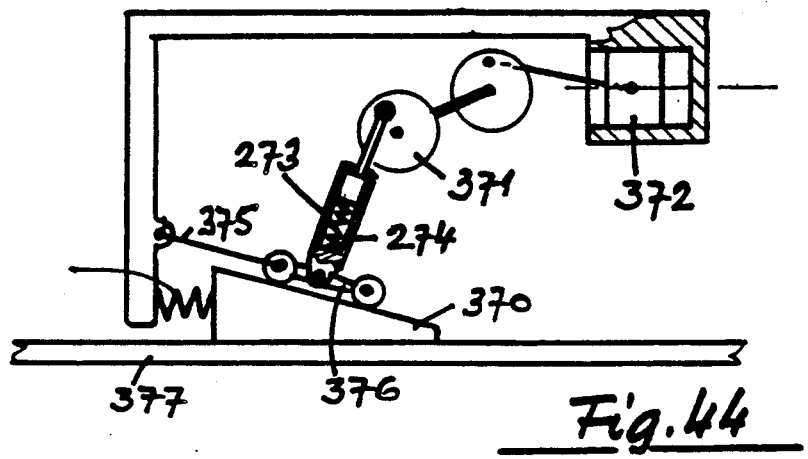

FIG. 44 shows diagrammatically the coupling of the functional parts in the case of an internal combustion engine 372 mechanically coupled via eccentric drive 371 with the wedge 370. The compression spring 273, which serves for the smoothing (which can be influenced by construction) of the sine characteristic of the crank mechanism, within the connecting rod part 274, moves, via the link carriage 376 guided by lever 375, the wedge 370 with the advancing member 377 coupled by frictional lock, against the spring 378.

Figure 45:
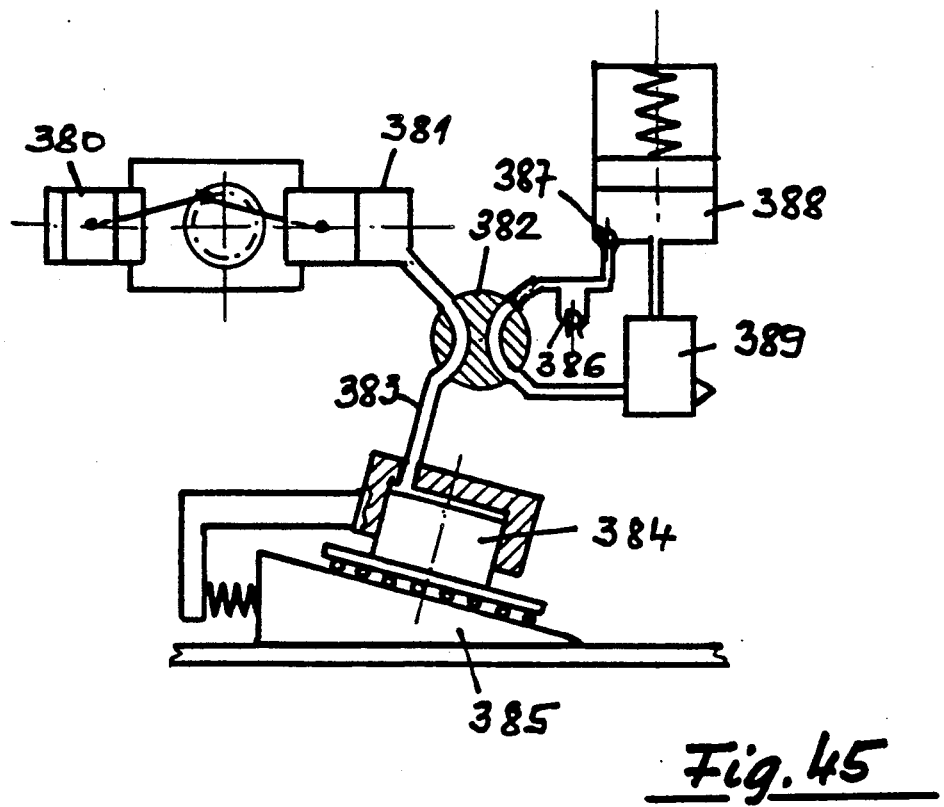

FIG. 45 shows a combustion engine 380 with a synchronously coupled compressor part 381 which, depending on the position of the rotary slide valve 382—as shown—via a compressed-gas cushion 380 moves the piston 384 and thus the wedge 385 synchronously. With the rotary slide valve turned 90°, the air drawn in via valve 386 is conveyed via non-return valve 387 into the pressure accumulator 388 so as to move the wedge, via control 389, by means of the accumulated compressed air.

Figure 46:
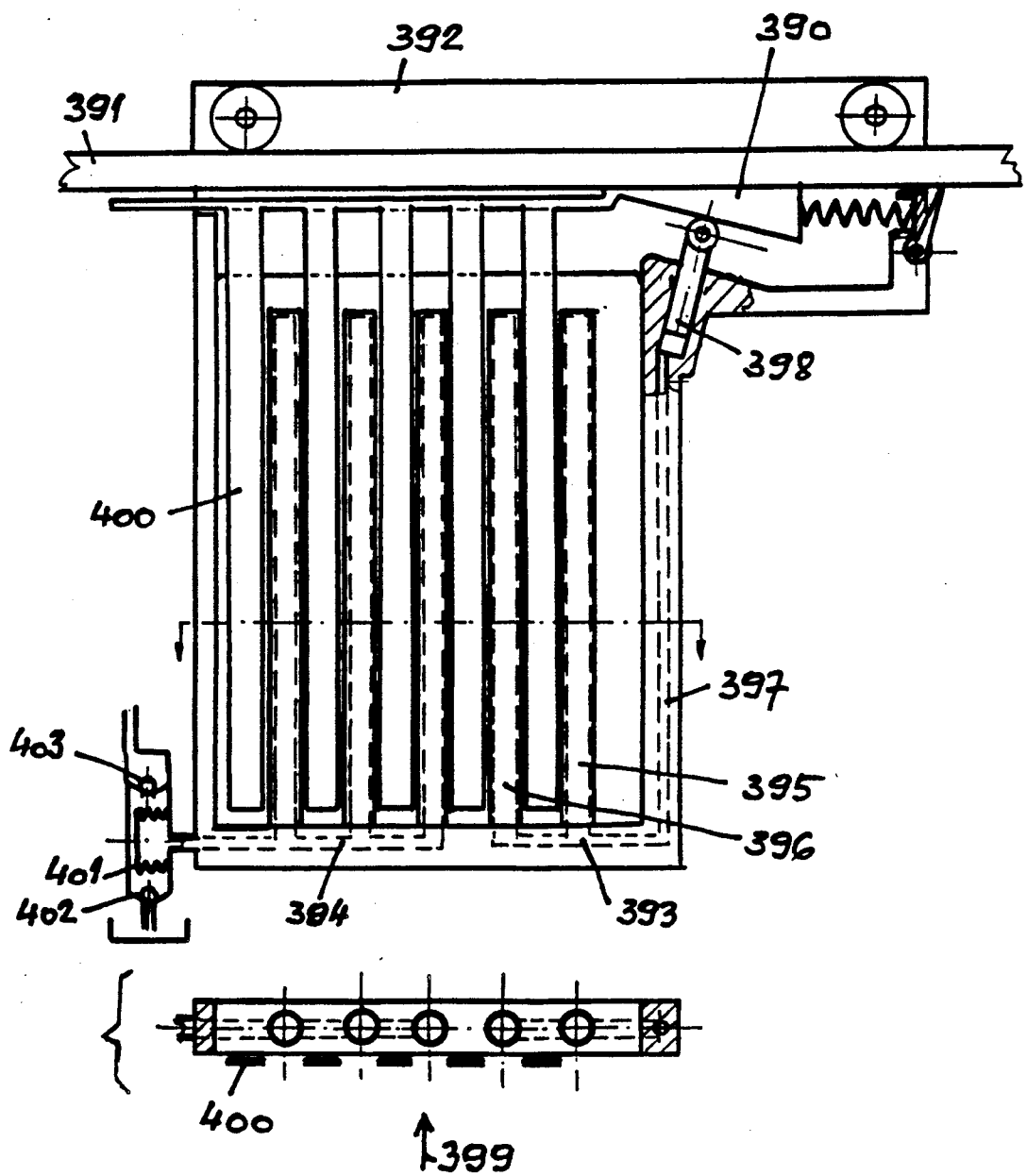

FIG. 46 shows an arrangement which, via the active wedge 390, can carry out, by thermohydraulic energy converter, advance movements and/or can control the thermohydraulic conversion for the filling of an accumulator or for other load. On the support member 392, which is represented on rail 391 as a hanging carriage, there are two container systems 393, 394 consisting of a plurality of chambers. The chambers 395 and 396 and channel 397 are filled with a liquid whose thermal coefficient of expansion is as high as possible (for instance: paraffin oil). The well-vented liquid filling and the temperature-proportional expansion in volume thereof is transmitted to the piston 398 and to the wedge 390. When the heat flow 399 takes place via heat radiation, for instance sun rays, a diaphragm system 400 can be moved along with it by the movement of the wedge, as a result of which the introduction of heat is interrupted. As a result, there is produced an oscillatory circuit the frequency of which is determined by the thermal inertia of the system and by the value of $\Delta T$ obtainable.

The figure shows the second container system 394 for the simultaneous conveyance of hydraulic pressure fluid. The fact that the suitable filling materials for the displacement work generally are not readily compatible with the elastomers of the seals of working apparatus make it advisable to transmit the pump process via fluid converters, for instance separating bellows 401, to a second hydraulic fluid.

A liquid conveyance in identical direction of the second fluid is produced upon the oscillation of the bellows 401 by the non-return valves 402, 403.

Figure 47:
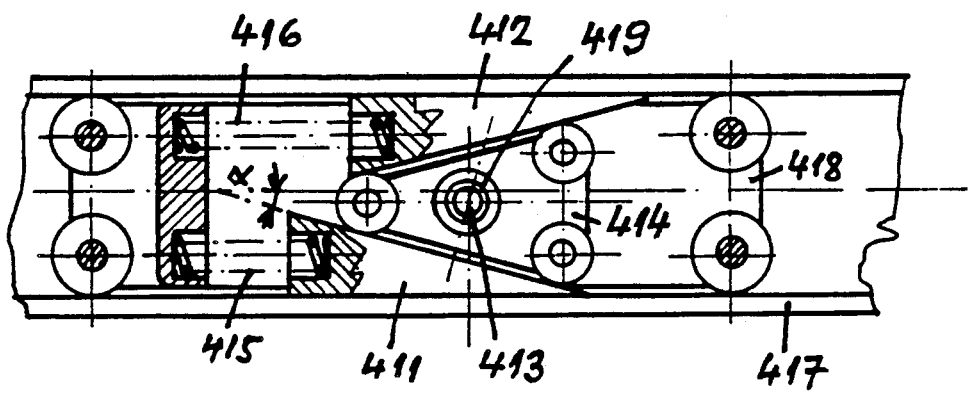

FIG. 47 shows a drive unit similar to FIG. 44, in a different construction and with two wedges 411 and 412 working in push-pull. By the rotating shaft of an internal combustion engine or an electric motor, directly or via gears (not shown), a cam shaft 413 is driven which bears a swing head 414 mounted for rotation thereon having three rollers. The rollers are pressed alternately during the rotation of the shaft against the wedges 411 and 412 which are prestressed by springs 415, 416, the wedges transmitting the forward movement also alternately and by frictional lock to the inner walls of the push member 417. The resultant changes in load in the transverse plane can be taken up by a carriage 418 which is supported in the push member.

The advancing movement results from the rising flanks of two phase-shifted sine lines, corresponding to their phase shift $180° - 2\alpha$ amounts (sic).

A uniform advance movement is produced by the mass inertia of the advanced part and via the free-travel properties of the wedge drives. A smoothening of the forward process can be effected, for instance, by an elastically dampening sleeve 419 around the eccentric bearing and/or similar construction of the swing head. A drive constructed similar to FIG. 47, but with wedges clamped inward from the outside, can be effected by the reversal by analogy of the construction.

Figure 48:
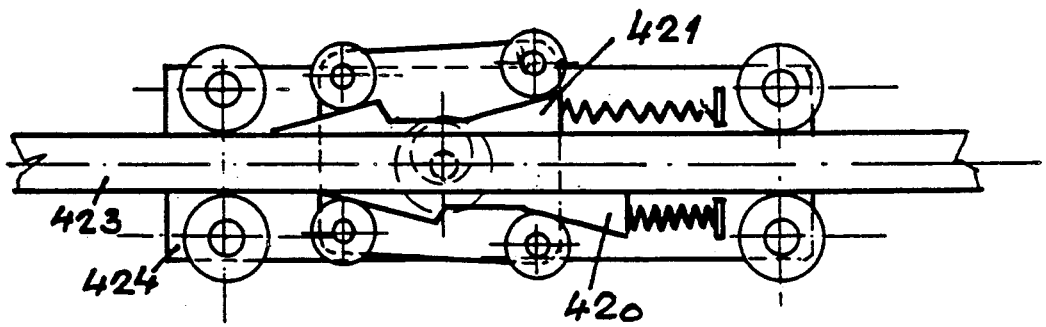

FIG. 48 shows diagrammatically such an arrangement, in which the wedges 420 and 421 are adapted inwards by the eccentric-driven swing head 422 against the feed member 423, along which the carriage 424 can also be guided.

Figure 49:
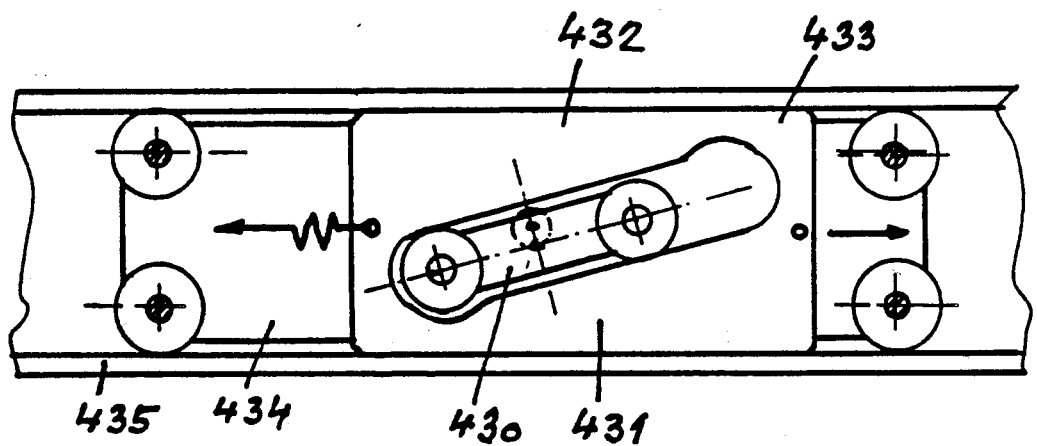

FIG. 49 also shows an example of an eccentric-driven device consisting of a swing head 430 with two rollers, which moves an advance feed plate 433 formed of the wedges 431 and 432 and is guided with carriage 434 in push members 435.

The advance direction is determined with the spring initial stress 436 or 437. The initial stress 436 brings the wedge 431 into action, while a shifting to the pretensioning device 437 brings the wedge 432 into action. The depression 438 makes possible the relief from pressure of the wedge at the lower dead center of the eccentric in the case of eccentric-driven wedges.

Figure 50:
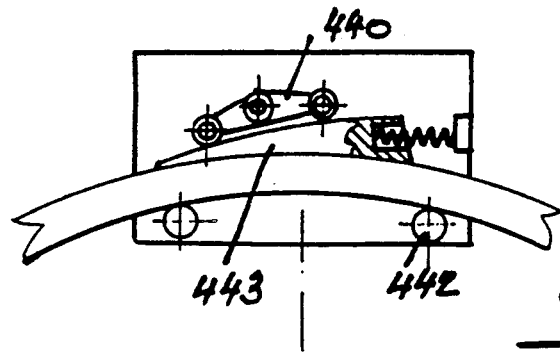

FIG. 50 shows one possible wedge shape in connection with the drive of washers by tangential force. The example shows an eccentric-driven swing head 440 on a part connected with the center of the washer or with abutment 442, acting on a curved wedge 443.

Figure 51:
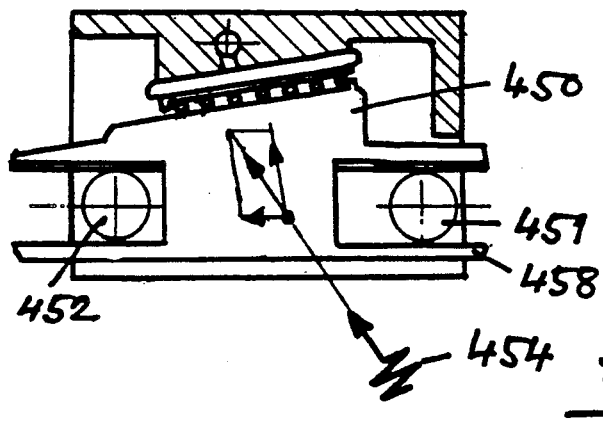

FIG. 51 shows the drive of cylindrical members of relatively small diameter. The wedge 450, which is, for example, hydrostatically driven, rests against two bodies of rotation 451, 452 at least one of which is operatively connected with a part which is to be driven. By the inclination of the installation of the return spring 454 the ratio of the force vectors for the emptying of the force cell 455 and for the returning of the wedge 450 can be predetermined. A return drive of the wedge can be obtained if the return-travel stop 458 of the wedge rests against the opposite side of the rollers 451 and 452.

Figure 52:
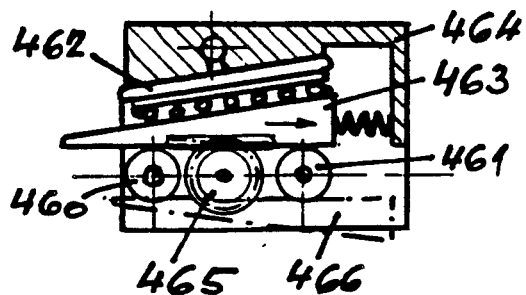

FIG. 52 shows the coupling of a wedge 463 lying on rollers 460 and 461 and moved for instance hydrostatically via force generating cell 462, the wedge being coupled with a gearwheel 465 which is supported in the housing part 464.

Such a gearwheel coupling can serve for the push-pull synchronization of a second wedge 466 or for the slip-free swing actuation of a shaft, as rotary drive, or to check or indicate the wedge position.

Figure 53:
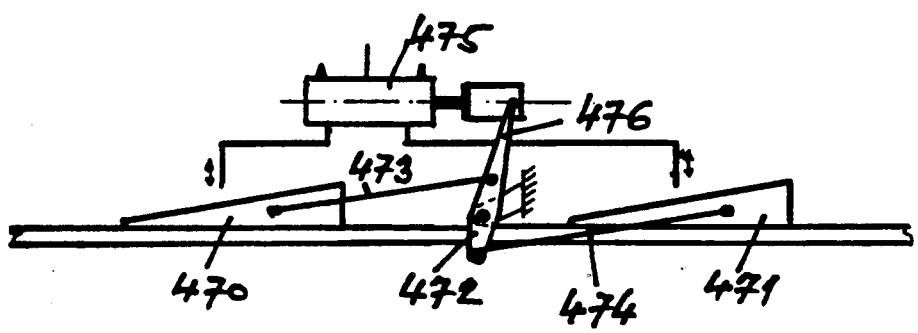

FIG. 53 shows the push-pull coupling of two drive wedges 470, 471 by a lever 472 and connecting rods 473, 474. The example shows diagrammatically the control of the wedges by control slide valve 475 by means of link-like stops, actuated by the lever extension 476.

Figure 54:
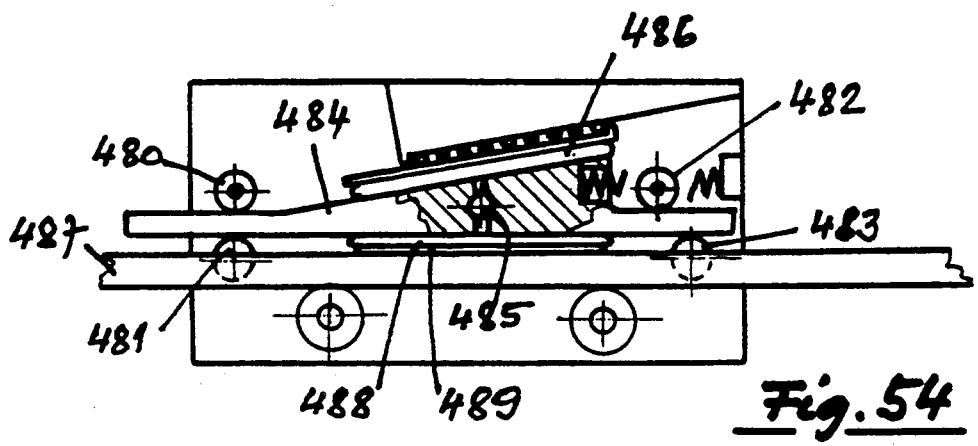

FIG. 54 shows a drive device having a wedge 484 guided between guide rollers 480, 481, 482 and 483 and controlled via channel 485 by the force cell 486.

The special feature of this example is that the coupling of the wedge to the advancing body 487 is effected not by the pressing-on of the wedge member but by a coupling cell 488—with friction covering 489—which is filled simultaneously with the force generating cell. A similar coupling cell can also be used in the other embodiments.

Figure 55:
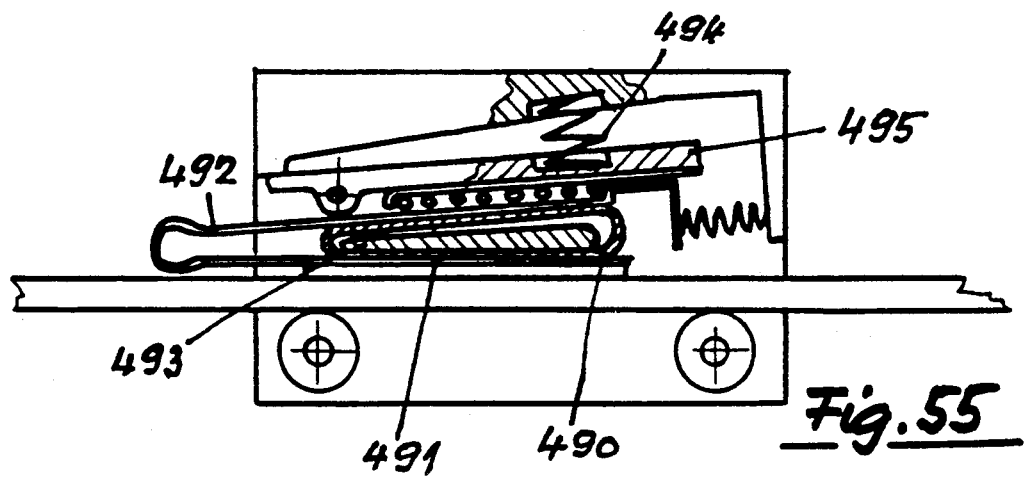

FIG. 55 shows a force generating cell 490 as wedge whose coupling surface 491 is held, for instance, by a steel leaf spring 492, which spring by initial tension can also support the emptying of the cell in the exhaust phase. A filling member 493 which is adapted to the minimum volume of the cell makes it possible to improve the volumetric efficiency.

Such completely elastic force cells afford particular advantages in the case of small advance units with high stroke frequency due to the possibility of strongly reducing the mass which is moved. They also make it possible to effect the load-dependent automatic adjustment of the wedge angle at little expense. For this there is used in the present example the supporting flap 495 which is acted on by spring 494.

Figure 56:
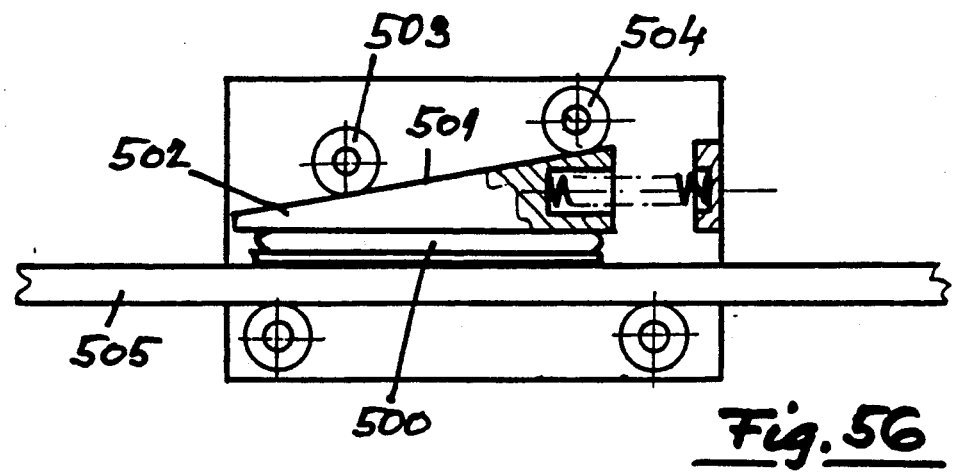

FIG. 56 shows an arrangement in which the coupling cell 500 also assumes the drive function, in which the inclined part 501 of the wedge 502 is directly supported at 503, 504 and upon the filling of the cell 500 the friction-locked coupling to the push member 505 and accordingly its advance take place.

Figure 57:
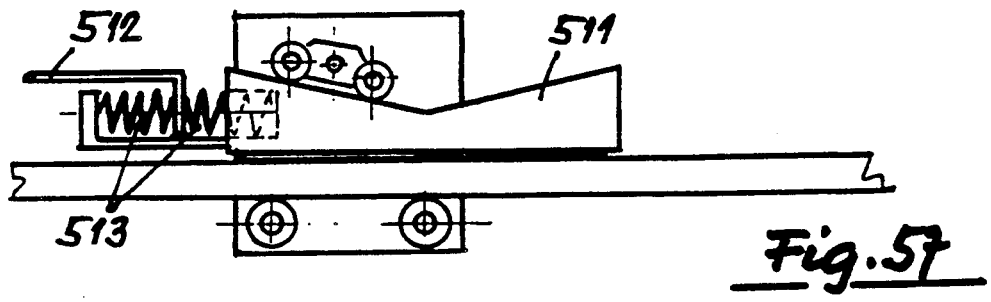

FIG. 57 shows a drive device 510 similar to FIG. 47, the direction of advance of which can be determined by the shifting of the double wedge 511. The shifting can be effected via rod 512 and spring pack 513 by pushing the rod 512 against the desired direction of advance and locking it. The displacement of the control process (in this case rod 512) in direction opposite the direction of advance makes it possible, upon the bistable locking thereof, to build up by simple means an automatically reversing drive between spring stops.

Figure 58:
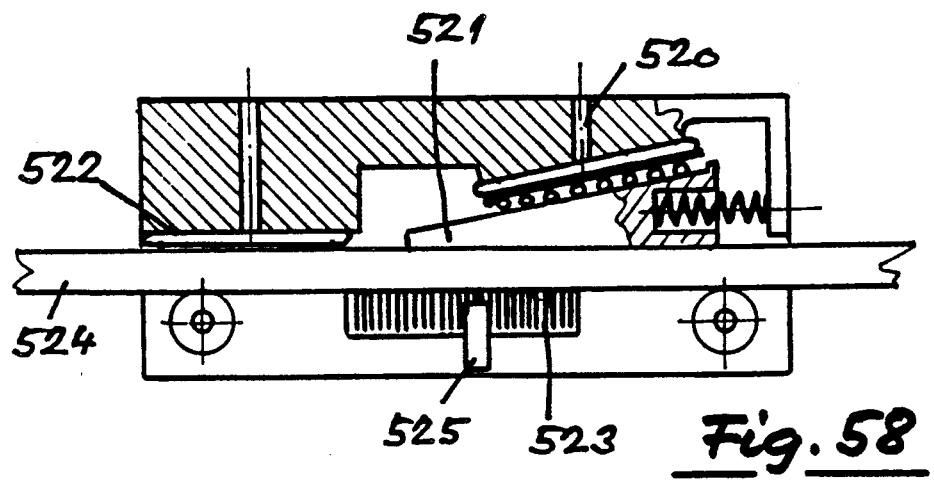

FIG. 58 shows a hydrostatically (520) driven wedge 521 and an adherence-brake part 522 with also hydrostatic actuation. Such a construction makes it possible to stop the wedge steps in any desired phase. This combination of advance and adherence brake makes it possible to build up novel positionings of a digital nature. For this purpose, a for instance incremental raster 523 is connected with the driven part or push member 524 and scanned, for instance, by a light barrier 525. Upon the counterposition, acknowledged by movement, of a pulse counter the adherence brake enters into operation.

This type of positioning can be used, in particular, in the case of production machines in order substantially to simplify the construction in the manner that instead of the customary construction of coordinate tables, the workpiece itself can be driven and a positioning control—which frequently consists only of an optical tabulator control—which is connected therewith releases the adherence brake, for instance as holder-down.

FIG. 59 shows the possibility of lifting a drive wedge from the friction surface during the return phase. The wedge 530 with a hydrostatic actuation 531 is pressed during the advance phase with the friction surfaces 532, 533 against a push member 534 and during the return phase slightly raised or at least relieved of load by the roller 535 and the spring 536 acting thereon.

For dependable operation the condition $$P_R < \frac{P_F}{\sin \alpha}$$

must be satisfied, in which $P_R$ is the spring force acting on the roller, $\alpha$ is the wedge angle and $P_F$ is the force of the spring 537.

Figure 60:
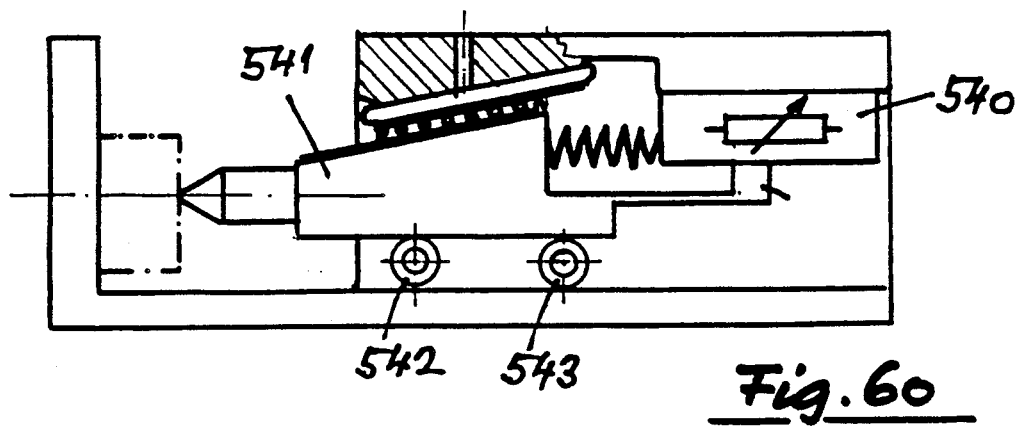

FIG. 60 shows a hydrostatically actuated wedge 541 which is coupled with the wiper of the slide potentiometer 540 and is so guided on rollers 542, 543 that the instantaneous wedge position can be converted into a path-proportional electric analog signal.

Such a coupling with a path measuring device of ohmic, inductive (differential transformer) or other type, and feedback to the medium pressure of the wedge actuation makes it possible to establish compensation controls of any desired size at little expense.

The use of a digital path measuring device makes the programmable positioning of the wedge possible.

A coupling of the wedge to a measurement sensor makes a sensitive, controllable sensor pressure possible as well as the analog or digital transfer of the measurement results.

Figure 61:
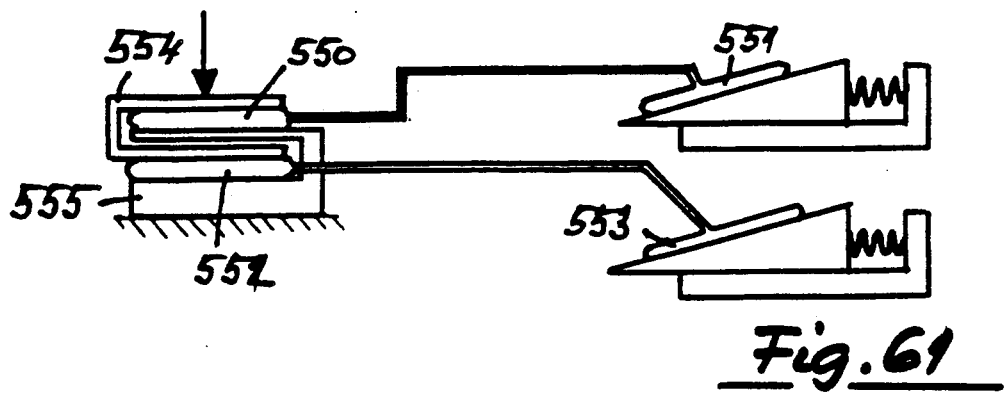

FIG. 61 shows a possibility for the synchronous operation of several wedges. The hydrostatically filled cells 550, 551 as well as 552 and 553 each form a closed hydromechanical transmission system. Their synchronization is effected via the mechanical coupling 554, in the same direction, of the active surfaces, as well as of the support surfaces 555. An arrangement in opposite direction of the primary cells 550 and 552 results in a push-pull drive.

Figure 62:
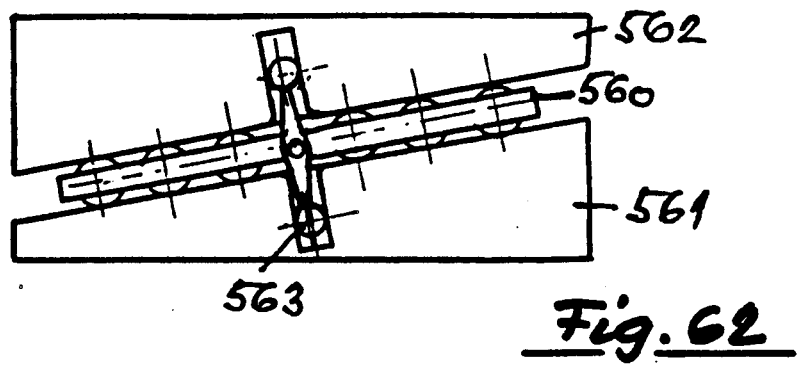

FIG. 62 shows the positive guidance of a roller mounting 560 between two bodies 561 and 562 which are displaced relative to each other—as is the case in connection with wedge supports—by at least one double-armed lever 563.

Figure 63:
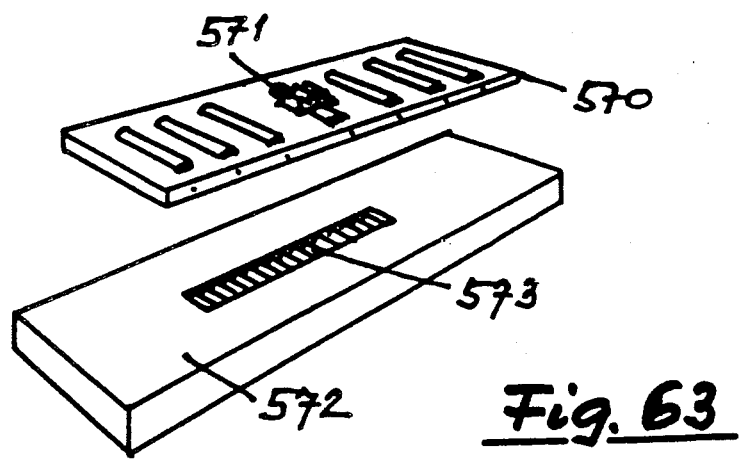

FIG. 63 shows the positive guidance of a needle cage 570 with installed gearwheel 571 and toothed paths 573 integrated into the support surface 572 (only one side shown).

Figure 64:
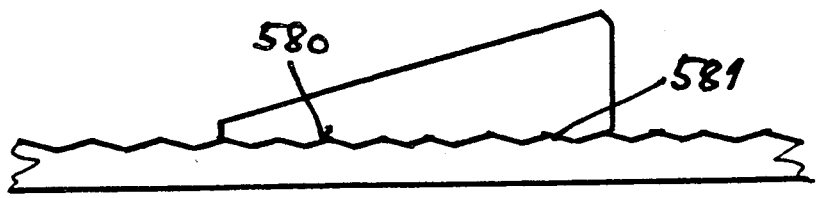

FIG. 64 shows the form-locked development of the wedge-adherent surface 580 by means of ribs 581. This provides advantages in the case of entirely slip-free precision drives, upon advance on oily surfaces or with a large wedge angle.

The embodiments shown comprise an extremely broad field of use.

The direct supporting of the fluid pressure in the case of the hollow piston (FIGS. 40, 41, 43) makes it possible to support large dynamic forces with little friction on the contact surfaces between piston and wedge.

In this way, large rapid units can be used individually or in any desired number as drive for highway and rail vehicles, centrifugal drives as starting aid for airplanes, lifesaving equipment, slide-step drives for heavy loads, as well as impact-oscillating apparatus such as concrete hammers, vibrators and rammers.

The above fields of use also apply for the showings of FIGS. 42, 44, 45, 51, 54, 56, 59, 62, 63.

Impulse drives of this kind can replace jet engines as starting accelerator, with the particular advantage that no blast is given off.

Merely a profiled bar which is anchored suitably on the acceleration path of the reaction force is required.

The speed obtainable in all probability with regular fuels such as gasoline is about 150 m/sec (=540 km/hour) and possibly even considerably higher with other fuels.

The apparatus of FIG. 46 shows the possibility of how low-grade heat can be converted directly into mechanical work.

The feeding back of the wedge movement can be effected instead of by diaphragms by the setting of control flaps, slide valves, cocks or the changing of the focus of mirrors.

The drives according to FIGS. 47, 48, 49, 57 are advantageous in particular for transport and servosystems such as automatic storage devices, suspended railways, feed systems, transfer lines, door actuations, movement of carriages and apparatus on straight or curved paths.

Embodiments in accordance with FIGS. 58 and 60 are particularly suitable for the development of NC-controlled manufacture and measuring devices as well as machine tools.

I claim:

1. A method of displacing a load in a selected direction with respect to a base surface, comprising the steps of:
   supporting the load on said base surface and on a supporting wedge, an upper surface of said wedge constituting an inclined slide support surface which faces upward and toward said selected direction, a bottom surface of said wedge resting directly upon said base surface; and
   interposing a mechanical lifting device between said load and said inclined slide support surface, and employing said lifting device to generate a lifting force generally perpendicular to said inclined slide support surface;
   whereby said lifting force has a driving component in said selected direction and a friction-reducing component generally perpendicular to said base surface;
   said driving component causing said load and said mechanical lifting device to slide along said slide support surface downward and in said selected direction with respect to said base surface, while the friction-reducing component of said lifting force resists the weight of said load with respect to said base surface;
   whereby applying said lifting force between said inclined slide support surface and said load causes said load to move in the selected direction with respect to the base surface.

2. A method of displacing a load in a selected direction, comprising the steps of:
   supporting the load partially on a base surface, and partially on a supporting wedge, an upper surface of said wedge constituting an inclined slide support surface which faces upward and toward said selected direction;
   supporting a bottom surface of said wedge directly upon said base surface; and
   interposing a mechanical lifting device between said load and said inclined slide support surface; and employing said lifting device to generate a lifting force generally perpendicular to said inclined displacement guide surface;
   whereby said lifting force has a friction-reducing component which resists the weight of said load against said base surface and thereby at least partially reduces friction between the load and said base surface; and a driving component which urges said load in said selected direction;
   whereby applying said lifting force between said inclined slide support surface and said load causes said load to slide downward and in said selected direction along said inclined slide support surface, whereby said load is displaced in said selected direction with respect to said base surface.

3. A method according to claim 2, wherein the load to be displaced is lifted by said friction-reducing component of the lifting force by a sufficient distance to avoid any irregularities of the base surface as the load is displaced with respect to the base surface in said selected direction.

4. An arrangement for displacing a load in a selected direction with respect to a base surface, comprising:
   a supporting wedge for being interposed between said load and said base surface, said supporting wedge including an inclined slide support surface which faces upward and toward said selected direction; and said load having a corresponding surface facing downward and away from said selected direction and thereby substantially parallel to said slide support surface;
   said slide support surface and said facing surface having a low coefficient of friction with respect to each other whereby they are slidable with respect to each other; and
   a mechanical lifting device fixed to said load between said load and said inclined slide support surface, and disposed for applying a lifting force generally perpendicular to said inclined slide support surface;
   said lifting force having a driving component which urges said load in said selected direction and thereby slides said facing surface along said slide support surface and displaces said load in said selected direction with respect to said base surface, and a friction-reducing component of said force which resists the weight of said load with respect to said base surface.

5. An arrangement for displacing a load along a base surface in a selected direction comprising:
   a supporting wedge for being interposed between said base surface and said load, said supporting wedge having an upper inclined slide support surface which is inclined upward and toward said selected direction; and said load having a corresponding surface facing downward and away from said selection direction and thereby substantially parallel to said slide support surface;
   said slide support surface and said facing surface having a low coefficient of friction with respect to each other whereby they are slidable with respect to each other; and a mechanical lifting device fixed to said load between said load and said slide support surface, and disposed for applying a lifting force generally perpendicular to said inclined slide support surface, said lifting force having a friction-reducing component which resists the weight of said load against said base surface; and a driving component which urges said load in said selected direction thereby permitting said load to slide relative to said slide support surface and said base surface, whereby said load is displaced in said selected direction.

6. An arrangement according to claim 5, wherein the mechanical lifting device comprises a membrane cell.

7. An arrangement for displacing a body according to claim 5, wherein the mechanical lifting device reduces the frictional forces between the load and the base surface which prevent the displacement of the load, by producing said friction-reducing component perpendicular to the selected direction of displacement, said load thus being permitted to be displaced by gravity along said inclined slide support surface.

8. An arrangement according to claim 7, wherein the inclined slide support surface comprises a low-friction material slide surface.

9. An arrangement according to claim 8, wherein the slide surface of the wedge is replaceable and the arrangement further includes a mating slide surface fastened to the load.

10. An arrangement according to claim 8, further comprising means for urging the wedge into a working position for applying said lifting force.

11. An arrangement according to claim 10, wherein said urging means comprises a spring mounted between said wedge and said load.

12. An arrangement according to claim 8, wherein the slide surface of the wedge is removable and the arrangement further includes a mating slide surface fastened to said inclined slide support surface.

13. An arrangement according to claim 8, wherein the slide surface of the wedge is replaceable and the arrangement further comprises a mating slide surface attached to said mechanical lifting device.

* * * * *